US 6,605,421 B2

(12) United States Patent
Kuse et al.

(10) Patent No.: US 6,605,421 B2
(45) Date of Patent: Aug. 12, 2003

(54) AQUEOUS SOLUTION CONTAINING HYDROXYLAMINE SALT AND STORING METHOD THEREOF

(75) Inventors: Satoru Kuse, Hino (JP); Hiroshi Yamashita, Hino (JP)

(73) Assignee: Konica Corporation (JP)

( * ) Notice: Subject to any disclaimer, the term of this patent is extended or adjusted under 35 U.S.C. 154(b) by 0 days.

(21) Appl. No.: 10/105,468

(22) Filed: Mar. 25, 2002

(65) Prior Publication Data

US 2003/0068588 A1 Apr. 10, 2003

(30) Foreign Application Priority Data

Mar. 29, 2001 (JP) .................................. 2001/095453

(51) Int. Cl.⁷ ......................... G03C 7/407; G03C 7/413
(52) U.S. Cl. ..................................................... 430/490
(58) Field of Search ................................. 430/490

(56) References Cited

U.S. PATENT DOCUMENTS 3,145,082 A * 8/1964 Rausch et al. .............. 423/275
3,647,449 A * 3/1972 Malloy ....................... 430/449
3,994,730 A * 11/1976 Frank et al. ................ 430/467

* cited by examiner

*Primary Examiner*—Hoa Van Le
(74) *Attorney, Agent, or Firm*—Muserlian, Lucas and Mercanti

(57) ABSTRACT

An aqueous solution comprising a hydroxylamine salt in an amount of 18 to 35 weight-%, wherein the aqueous solution further comprises at least one compound selected from the group consisting of amino polycarboxylic acids and compounds represented by the general Formulas [1] to [6] in an amount of 1 to 30 weight-%, and pH of the aqueous solution is within the range of from 2 to 6.

16 Claims, No Drawings

AQUEOUS SOLUTION CONTAINING HYDROXYLAMINE SALT AND STORING METHOD THEREOF

FIELD OF THE INVENTION

The present invention relates to a concentrated aqueous hydroxylamine salt solution and a method for stably storing the concentrated aqueous hydroxylamine solution.

BACKGROUND OF THE INVENTION

Processing of silver halide color photographic photosensitive materials is essentially comprised of two processes, color development and desilvering, and the desilvering is comprised of bleaching and fixing steps, or a bleach-fixing step. In addition thereto, such processes as rinsing and stabilizing may also be conducted.

A color developing solution employed in a color development process has been commonly comprised of a p-phenylenediamine type compound as a developing agent, a hydroxylamine salt or a sulfite salt as an antioxidant, and a carbonate as a buffering agent. The color developing solutions are divided into several parts and handled as concentrated solution kit forms, in order to be as light as possible in terms of transportation and storage. A kit part containing a hydroxylamine salt, when it is prepared as a concentrated solution, has problems of precipitated crystals in winter or while being stored or transported in highly northern regions and deterioration of storage quality in summer or while being stored or transported in tropical regions.

Heretofore, over the years, various techniques have been studied to improve the stability of hydroxylamine. For example, a method in which sodium ethylenediamine tetraacetate is added to a solution of a hydroxylamine salt as described in U.S. Pat. No. 3,145,082, a method in which sodium hydroxyalkylidene diphosphate is added to a solution of a hydroxylamine salt as described in U.S. Pat. No. 3,647,449, or a method in which mercaptothiazole is added to a solution of a hydroxylamine salt as described in JP-A 5-170723 (the term, JP-A refers to an unexamined and published Japanese Patent Application) has been proposed. However, these methods are aimed to improve storage stability, when a hydroxylamine salt solution is in an alkaline state, in a high temperature state, or in the presence of tiny amount of heavy metal ions such as an iron, copper or nickel ion, and no techniques which solve both problems of storage stability at low temperatures (precipitation) and of stability at high temperature storage, of a concentrated solution of a hydroxylamine salt, simultaneously, have been known.

It is preferred to handle a hydroxylamine solutions in as concentrated a state as possible, because the container can be quite small and the total weight of the solution can remain quite light, resulting in improved handling characteristics as well as lower cost in physical distribution.

Further, known as a similar constitution to the present invention is an anti-corrosive washing composition to eliminate residual materials of plasma etching by use of a hydroxylamine salt aqueous solution such as described in JP-A 2001-501649, and the concentration and pH of the hydroxylamine salt solution is partly in the same region as the present invention but the additives are different. In addition, a quaternary ammonium hydroxide which is a necessary constitutive condition of said patent (JP-A 2001-501649) exhibits no effect on stability at low temperatures and at high temperatures when it is employed in the present invention, and hence the constitution and purpose are different from the present invention.

PROBLEMS TO BE SOLVED BY THE INVENTION

Accordingly, it a first object of the present invention to provide a method, in which crystal precipitation from a concentrated aqueous hydroxylamine salt solution is minimized, even when stored at a relatively low temperature.

It is a second object of the invention to provide a method, in which a concentrated aqueous hydroxylamine solution is stably stored keeping its components in solution, even when stored at a relative high temperature.

It is a third object of the invention to provide an aqueous hydroxylamine salt-containing solution, which can be supplied in a concentrated form, thereby allowing its container to be smaller and the total weight to be lighter, leading to more suitability for handling and physical distribution, and a method for storing the aqueous hydroxylamine-containing solution.

SUMMARY OF THE INVENTION

As a result of extensive studies, the foregoing objects of the invention can be accomplished by the following constitution.

[Structure 1]

An aqueous solution comprising a hydroxylamine salt in an amount of 18 to 35 weight-%, wherein the aqueous solution further comprises at least one compound selected from the group consisting of amino polycarboxylic acids and compounds represented by the following Formulas [1] to [6] in an amount of 1 to 30 weight-%, and pH of the aqueous solution is within the range of from 2 to 6:

Formula [1]

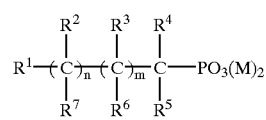

wherein $R_1$ through $R_7$ each represent independently a hydrogen atom, —OH, —COOM, —PO$_3$M$_2$, —SO$_3$M or a substituted or unsubstituted alkyl group having 1 to 6 carbon atoms, in which M is a hydrogen atom or an alkali metal; n and m each represent 0 or 1, provided that both m and n are not 0 at the same time;

Formula [2]

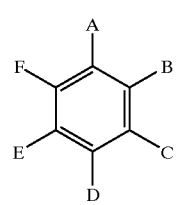

wherein at least one of A through F represents a sulfonic acid group or a sulfonic acid ester group, and the others represent a hydrogen atom, a halogen atom, a hydroxyl group or a saturated or unsaturated alkyl group;

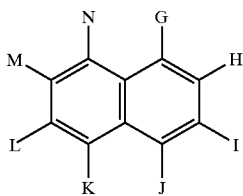

Formula [3]

wherein, at least one of G through N represents a sulfonic acid group or a sulfonic acid ester group, and the others represent a hydrogen atom, a halogen atom, a hydroxyl group or a saturated or unsaturated alkyl group;

$$R_{41}-SO_3M \quad \text{Formula [4]}$$

wherein $R_{41}$ represents a substituted or unsubstituted, saturated or unsaturated hydrocarbon group having 1 to 20 carbon atoms, and M represents a hydrogen atom, or an alkali metal;

$$HO-(A_1-O)l_1-(A_2-O)l_2-(A_3-O)l_3-H \quad \text{Formula [5]}$$

wherein $A_1$, $A_2$, and $A_3$ each represent a substituted or unsubstituted, straight or branched chain alkylene group, which may be the same or different; $l_1$, $l_2$, and $l_3$ each represent 0 or an integer of 1 to 500;

$$R_1-N\begin{matrix}R_2\\R_3\end{matrix} \quad \text{Formula [6]}$$

wherein $R_1$ represents a substituted or unsubstituted hydroxyalkyl group or a substituted or unsubstituted aminoalkyl group; and $R_2$ and $R_3$ each represent a hydrogen atom, a substituted or unsubstituted alkyl group, a substituted or unsubstituted hydroxyalkyl group or a substituted or unsubstituted benzyl group, provided that $R_1$ and $R_2$, $R_2$ and $R_3$, $R_3$ and $R_1$, or $R_1$, $R_2$ and $R_3$ may combine with each other to form a ring.

[Structure 2]

An aqueous solution comprising a hydroxylamine salt in an amount of 18 to 35 weight-%, wherein the aqueous solution further comprises at least one compound selected from the group consisting of sorbitan polyethylene oxides, derivatives of sorbitan polyethylene oxide and compounds represented by the following Formulas [7] or [8] in an amount of 0.1 to 10 weight-%, and pH of the aqueous solution is within the range of from 2 to 6:

$$A-O-(B)_m-(C)_n-X \quad \text{Formula [7]}$$

wherein A represents a monovalent organic group or an aryl group substituted by an alkyl group having 1 to 35 carbon atoms or by an alkenyl group having 2 to 35 carbon atoms; B and C, which may be the same or different, each represents $$-(CH_2)_a-(CH)_b-(CH_2)_c-O-$$
$$\quad\quad\quad | $$
$$\quad\quad (CH_2)_d-Y$$

in which a, b and c each are 0, 1, 2 or 3, d is 0 or 1, and Y is a hydrogen atom or a hydroxyl group; m and n each represent an integer of 1 to 100; X represents a hydrogen atom, an alkyl group, an aralkyl group or an aryl group;

$$A-O-(CH_2CH_2O)_n-SO_3M \quad \text{Formula [8]}$$

wherein M represents an alkali metal, a hydrogen atom, an ammonium salt or an alkanolamine salt; n is an integer of 1 to 100; and A represents a monovalent organic group or an aryl group substituted by an alkyl group having 3 to 20 carbon atoms.

[Structure 3]

The aqueous solution of Structure 1, wherein the aqueous solution comprises at least one compound represented by Formula [1] in an amount of 1 to 30 weight-%.

[Structure 4]

The aqueous solution of Structure 1, wherein the aqueous solution comprises at least one amino polycarboxylic acid in an amount of 1 to 30 weight-%.

[Structure 5]

The aqueous solution of Structure 1, wherein the aqueous solution comprises at least one compound represented by Formula [2], [3] or [4] in an amount of 1 to 30 weight-%.

[Structure 6]

The aqueous solution of Structure 1, wherein the aqueous solution comprises at least one compound represented by Formula [5] or [6] in an amount of 1 to 30 weight-%.

[Structure 7]

The aqueous solution of Structure 1, wherein the aqueous solution comprises at least one compound selected from the group consisting the amino polycarboxylic acids and the compounds represented by Formula [1] to [6] in an amount of 3 to 20 weight-%.

[Structure 8]

The aqueous solution of Structure 2, wherein the aqueous solution comprises at least one compound selected from the group consisting of sorbitan polyethylene oxides, derivatives of sorbitan polyethylene oxide and compounds represented by the following Formulas [7] or [8] in an amount of 0.4 to 5 weight-%.

[Structure 9]

The aqueous solution of Structure 1, wherein pH of the aqueous solution is within the range of 2.5 to 4.5.

[Structure 10]

The aqueous solution of Structure 2, wherein pH of the aqueous solution is within the range of 2.5 to 4.5.

[Structure 11]

A storing method of an aqueous solution comprising a hydroxylamine salt in an amount of 18 to 35 weight-%, wherein the storing method comprises a step of storing the aqueous solution in an plastic container having an oxygen permeation coefficient at 20° C. and 65% RH of not more than 40 ml/m²·atm·day, and wherein the aqueous solution further comprises at least one compound selected from the group consisting of amino polycarboxylic acids and compounds represented by the following Formulas [1] to [6] in an amount of 1 to 30 weight-%, and pH of the aqueous solution is within the range of from 2 to 6:

Formula [1]

$$R^1-(C)_n-(C)_m-C-PO_3(M)_2$$
with substituents $R^2, R^3, R^4$ above and $R^7, R^6, R^5$ below wherein $R_1$ through $R_7$ each represent independently a hydrogen atom, —OH, —COOM, —PO$_3$M$_2$, —SO$_3$M or a substituted or unsubstituted alkyl group having 1 to 6 carbon atoms, in which M is a hydrogen atom or an alkali metal; n and m each represent 0 or 1, provided that both m and n are not 0 at the same time;

Formula [2]

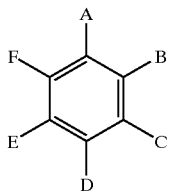

wherein at least one of A through F represents a sulfonic acid group or a sulfonic acid ester group, and the others represent a hydrogen atom, a halogen atom, a hydroxyl group or a saturated or unsaturated alkyl group;

Formula [3]

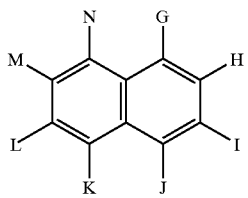

wherein, at least one of G through N represents a sulfonic acid group or a sulfonic acid ester group, and the others represent a hydrogen atom, a halogen atom, a hydroxyl group or a saturated or unsaturated alkyl group;

$R_{41}$—$SO_3M$    Formula [4]

wherein $R_{41}$ represents a substituted or unsubstituted, saturated or unsaturated hydrocarbon group having 1 to 20 carbon atoms, and M represents a hydrogen atom, or an alkali metal;

HO—$(A_1$—$O)l_1$—$(A_2$—$O)l_2$—$(A_3$—$O)l_3$—H    Formula [5]

wherein $A_1$, $A_2$, and $A_3$ each represent a substituted or unsubstituted, straight or branched chain alkylene group, which may be the same or different; $l_1$, $l_2$, and $l_3$ each represent 0 or an integer of 1 to 500;

Formula [6]

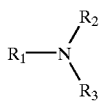

wherein $R_1$ represents a substituted or unsubstituted hydroxyalkyl group or a substituted or unsubstituted aminoalkyl group; and $R_2$ and $R_3$ each represent a hydrogen atom, a substituted or unsubstituted alkyl group, a substituted or unsubstituted hydroxyalkyl group or a substituted or unsubstituted benzyl group, provided that $R_1$ and $R_2$, $R_2$ and $R_3$, $R_3$ and $R_1$, or $R_1$, $R_2$ and $R_3$ may combine with each other to form a ring.

[Structure 12]

A storing method of an aqueous solution comprising a hydroxylamine salt in an amount of 18 to 35 weight-%, wherein the storing method comprising a step of storing the aqueous solution in an plastic container having an oxygen permeation coefficient at 20° C. and 65% RH of not more than 40 ml/m²·atm·day, and wherein the aqueous solution further comprises at least one compound selected from the group consisting of sorbitan polyethylene oxides, derivatives of sorbitan polyethylene oxide and compounds represented by the following Formulas [7] or [8] in an amount of 0.1 to 10 weight-%, and pH of the aqueous solution is within the range of from 2 to 6:

A—O—$(B)_m$—$(C)_n$—X    Formula [7]

wherein A represents a monovalent organic group or an aryl group substituted by an alkyl group having 1 to 35 carbon atoms or by an alkenyl group having 2 to 35 carbon atoms; B and C, which may be the same or different, each represents

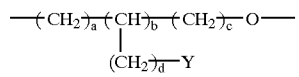

in which a, b and c each are 0, 1, 2 or 3, d is 0 or 1, and Y is a hydrogen atom or a hydroxyl group; m and n each represent an integer of 1 to 100; X represents a hydrogen atom, an alkyl group, an aralkyl group or an aryl group;

A—O—$(CH_2CH_2O)_n$—$SO_3M$    Formula [8]

wherein M represents an alkali metal, a hydrogen atom, an ammonium salt or an alkanolamine salt; n is an integer of 1 to 100; and A represents a monovalent organic group or an aryl group substituted by an alkyl group having 3 to 20 carbon atoms.

[Structure 13]

The storing method of Structure 11, wherein the plastic container is a flexible bag.

[Structure 14]

The storing method of Structure 12, wherein the plastic container is a flexible bag.

[Structure 15]

The storing method of claim 11, wherein the oxygen permeation coefficient of the plastic container is not more than 20 ml/m²·atm·day.

[Structure 16]

The storing method of Structure 12, wherein the oxygen permeation coefficient of the plastic container is not more than 20 ml/m²·atm·day.

DETAILED DESCRIPTION OF THE INVENTION

The invention will be further concretely explained below.

In the present invention, it has been found that an aqueous hydroxylamine salt solution having a concentration of 18 to 35 weight %, containing specific compounds at a specific concentration range, and further having a pH within the range of 2 to 6 has surprisingly overcome the problems of storage stability of a hydroxyl amine concentrated solution at low temperatures (crystallization property) as well as the storage stability at high temperatures, leading to the constitution of the present invention.

Compounds represented by the general formula [I] will now be detailed:

General formula [I]

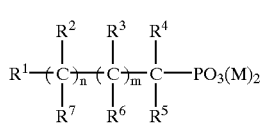

wherein, each of $R_1$ to $R_7$ represents independently a hydrogen atom, —OH, —COOM, —$PO_3M_2$, —$SO_3M$, or, a substituted or unsubstituted alkyl group having 1 to 6 carbon atoms. "n" and "m" represent 0 or 1 but both of them are not 0 at the same time.

In the general formula [I], the alkyl group preferably has 1 to 4 carbon atoms, which may be either of a straight chain or branched chain type and may also be substituted with a substituent. Preferable substituents include —OH, —COOM, —PO$_3$M$_2$, —SO$_3$M and —NR$_8$R$_9$, in which R$_8$ and R$_9$ each represent independently a hydrogen atom or an alkyl group having 1 to 3 carbon atoms. M represents a hydrogen atom or an alkali metal, and preferably an alkali metal; "n" and "m" represent 0 or 1, but both of them are not 0 at the same time. R$_1$ to R$_9$ each may be the same or different.

Preferable examples of the compounds represented by the general formula [I] will be listed below, however, the invention is not limited thereby.

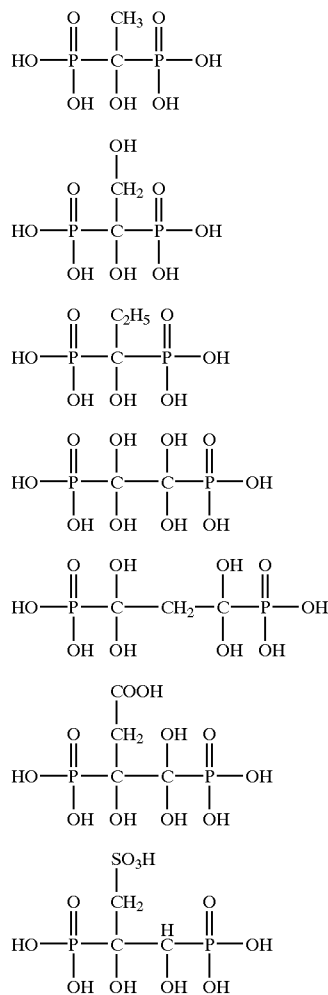

Next, aminopolycarboxylic acids will be detailed.

As the aminopolycarboxylic acids of the invention, compounds represented by the following general formulas A-I to A-IV are preferably employed:

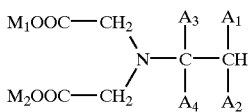

General formula [A-I]

wherein A$_1$ to A$_4$, which may be the same or different represent a hydrogen atom, a hydroxyl group, —COOM, —PO$_3$(M$_1$)$_2$, —CH$_2$COOM$_2$, —CH$_2$OH or an alkyl group having 10 or less of carbon atoms, provided that at least one of A$_1$ to A$_4$ is —COOM, —PO$_3$(M$_1$)$_2$ or —CH$_2$COOM$_2$; M, M$_1$ and M$_2$ each represent a hydrogen atom, an ammonium group, an alkali metal or an organic ammonium group;

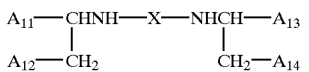

General formula [A-II]

wherein A$_{11}$ to A$_{14}$, which may be the same or different represent —CH$_2$OH, —COOM$_3$, or —PO$_3$(M$_4$)$_2$; M$_3$ and M$_4$ each represent a hydrogen atom, an ammonium group, an alkali metal or an organic ammonium group; X represents an alkylene group having 2 to 6 carbon atoms, or —(B$_1$O)$_n$—B$_2$—; "n" represents an integer from 1 to 8, and B$_1$ and B$_2$, which may be the same or different, represents an alkylene group having 1 to 5 carbon atoms. In aforementioned general formula [A-II], an alkylene groups represented by X includes such as an ethylene, propylene or butylene group. In —(B$_1$O)$_n$—B$_2$— represented by X, the alkylene group represented by B$_1$ and B$_2$ includes such as methylene, ethylene and trimethylene. These alkylene groups may be substituted with a lower alkyl group such as methyl or ethyl group, or a hydroxyl group;

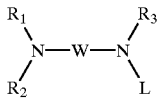

General formula [A-III]

wherein each of R$_1$ to R$_3$ represents independently a hydrogen atom, a substituted or unsubstituted alkyl group or a substituted or unsubstituted aryl group; W represents a bivalent connecting group; L represents anyone of the following:

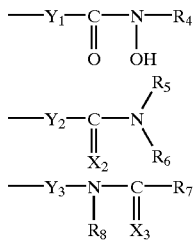

wherein Y$_1$ to Y$_3$ each represent a substituted or unsubstituted alkylene group or a substituted or unsubstituted arylene group, X$_2$ and X$_3$ each represent an oxygen atom or a sulfur atom, and R$_4$ to R$_8$ each represent a hydrogen atom, an alkyl group or an aryl group.

An alkyl group represented by R$_1$ to R$_3$ includes straight chain, branched chain or cyclic alkyl groups having 1 to 10 carbon atoms, and specifically preferable is a methyl or ethyl group. As an aryl group represented by R$_1$ to R$_3$ is preferably a phenyl group. When $R_1$ to $R_3$ are alkyl groups or aryl groups, they may be provided with a substituent. The substituent for $R_1$ to $R_3$ include, for example, an alkyl group, an aralkyl group, an alkenyl group, an alkynyl group, an alkoxy group, an aryl group, a substituted amino group, an acylamino group, a sulfonylamino group, an ureido group, an urethane group, an aryloxy group, a sulfamoyl group, a carbamoyl group, an alkylthio group, a sulfonyl group, a sulfinyl group, a hydroxyl group, a halogen atom, a cyano group, a sulfo group, a carboxyl group, a phosphono group, an alkoxycarbonyl group, an aryloxycarbonyl group, an acyl group, an acyloxy group, a carbonamide group, a sulfonamide group, nitro group, etc. and preferable are the substituents represented by the following:

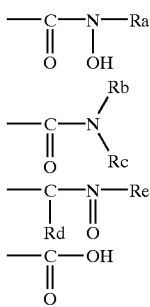

wherein $R_a$, $R_b$, $R_c$, $R_d$ and $R_e$ represent a hydrogen atom, an alkyl group or an aryl group.

Next, the alkylene groups represented by $Y_1$ to $Y_3$ include, for example, a methylene group, an ethylene group and a propylene group, and the arylene groups include a phenylene group. The alkylene groups and arylene groups represented by $Y_1$ to $Y_3$ may be substituted by a substituent. As the substituents, those listed for $R_1$ to $R_3$ described above can be employed, and preferable are the following:

—OH
—COOH
—CH$_2$COOM
—CH$_2$OH
—CONH$_2$
—CH$_2$CONH$_2$
—CONHCH$_3$ where M represents a hydrogen atom, an alkali metal or an ammonium group.

In the general formula [A-III] described above, the bivalent connecting groups represented by W preferably include an alkylene group having 2 to 8 carbon atoms (including a cyclohexylene group), an arylene group having 6 to 10 carbon atoms,

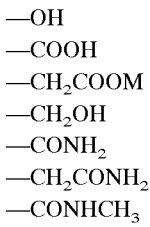

where $B_1$ and $B_2$ represent an alkylene group or an arylene group, and "n" represents 1 to 3;

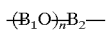

where Z represents a hydrogen atom, an unsubstituted or a —COOM, —SO3M, or —OH substituted alkyl group, and M represents a hydrogen atom, an alkali metal or an ammonium group, and combinations thereof.

General formula [A-IV]

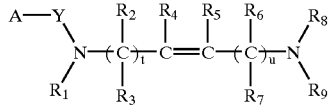

In the formula, $R_1$ to $R_3$, and, $R_6$ to $R_9$ each represent a hydrogen atom, an alkyl group or aryl group which may be substituted; $R_4$ and $R_5$ each represent a hydrogen atom, a halogen atom a cyano group, a nitro group, an acyl group, a sulfamoyl group, a carbamoyl group, an alkoxycarbonyl group, an allyloxycarbonyl group, a sulfonyl group, a sulfinyl group or an alkyl or aryl group which may be substituted, and $R_4$ and $R_5$ may combine to a 5-membered or 6-membered ring. "A" represents a carboxyl group, a phosphono group, a sulfo group, a hydroxyl group, including their alkali metal or ammonium salts. Y represents an alkylene group or an arylene group, which may be substituted by a substituent. "t" and "u" each represent independently 0 or 1.

Among compounds represented by the general formula [A-IV], the compounds represented by the following general formula [B-I] and [B-II] are preferable:

General formula [B-I]

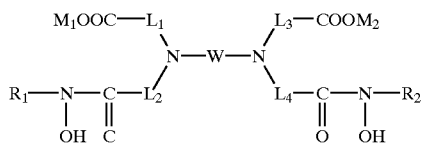

wherein $R_1$ and $R_2$ each represent a hydrogen atom, an alkyl group or an aryl group, $L_1$ to $L_4$ each represent an alkylene group or an arylene group, and $M_1$ and $M_2$ each represent a hydrogen atom, an alkali metal, an ammonium group or an organic ammonium group, W represents a bivalent connecting group;

General formula [B-II]

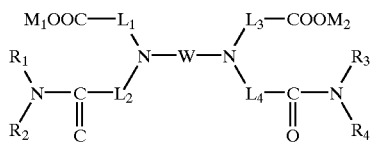

wherein $R_1$ to $R_4$ each represent the same as defined in $R_1$ and $R_2$ of the general formula [B-I], and $L_1$ to $L_4$, and, $M_1$, $M_2$ and W also represent the same as those of the general formula [B-I].

Specific examples of aminopolycarboxylic acids relating to the invention will be listed below.

A-I-1

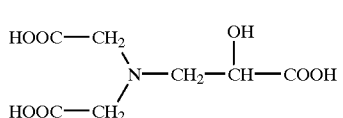

A-I-2

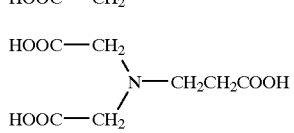

-continued

A-I-3: (NaOOC-CH₂)(NaOOC-CH₂)N-CH(COONa)-CH₂OH

A-I-4: (HOOC-CH₂)(HOOC-CH₂)N-C(COOH)(CH₃)-CH₂OH

A-I-5: (HOOC-CH₂)(HOOC-CH₂)N-C(COOH)(CH₂OH)-CH₂OH

A-I-6: (HOOC-CH₂)(HOOC-CH₂)N-CH₂CH₂-PO₃H₂

A-I-7: (HOOC-CH₂)(HOOC-CH₂)N-C(COOH)(C₂H₅)-CH₂OH

A-I-8: (NH₄OOC-CH₂)(NH₄OOC-CH₂)N-CH(PO₃(NH₄)₂)-CH₂OH

A-I-9: (HOOC-CH₂)(HOOC-CH₂)N-CH₂-CH(OH)-PO₃H₂

A-I-10: (HOOC-CH₂)(HOOC-CH₂)N-CH(OH)-CH₂-CH₂-COOH

A-I-11: (HOOC-CH₂)(HOOC-CH₂)N-CH₂CH₂CH₂-COOH

A-I-12: (HOOC-CH₂)(HOOC-CH₂)N-CH₂-CH(OH)-CH₂-COOH

A-I-13: (HOOC-CH₂)(HOOC-CH₂)N-CH(COOH)-CH₂COOH

A-I-14: (HOOC-CH₂)(HOOC-CH₂)N-CH(CH₂COOH)-CH₂COOH

A-I-15: (HOOC-CH₂)(HOOC-CH₂)N-CH₂CHCOOH-CH₂COOH

A-II-1: HOOC-CH(CH₂COOH)-NH-CH₂CH₂-NH-CH(CH₂COOH)-COOH

A-II-2: HOOC-CH(CH₂COOH)-NH-CH(OH)CH₂-NH-CH(CH₂COOH)-COOH

A-II-3: HOOC-CH(CH₂COOH)-NH-CH₂CH₂CH₂-NH-CH(CH₂COOH)-COOH

A-II-4: HOOC-CH(CH₂COOH)-NH-CH₂-CH(OH)CH₂-NH-CH(CH₂COOH)-COOH

A-II-5: HOOC-CH(CH₂COOH)-NH-CH₂-CH(CH₃)CH₂-NH-CH(CH₂COOH)-COOH

A-II-6: HOOC-CH(CH₂COOH)-NH-CH₂CH₂CH₂CH₂-NH-CH(CH₂COOH)-COOH

A-II-7: HOCH₂-CH(CH₂COOH)-NH-CH₂CH₂-NH-CH(CH₂COOH)-COOH

A-II-8: NaOOC-CH(CH₂COOH)-NH-CH₂CH₂-NH-CH(CH₂COOH)-COONa

A-II-9: HOOC-CH(CH₂COOH)-NH-CH₂OCH₂-NH-CH(CH₂COOH)-COOH

A-II-10: HOOC-CH(CH₂COOH)-NH-CH₂CH₂OCH₂-NH-CH(CH₂COOH)-COOH

A-II-11: HOOC-CH(CH₂COOH)-NH(CH₂O)₂CH₂-NH-CH(CH₂COOH)-COOH

A-II-12: HOCH₂-CH(CH₂COOH)-NH-CH₂OCH₂-NH-CH(CH₂COOH)-COOH

A-II-13: HOOC-CH(CH₂COOH)-NH-CH(CH₃)OCH₂-NH-CH(CH₂COOH)-COOH

A-II-14: HOOC-CH(CH₂COOH)-NH-CH₂CH₂O-CH₂CH₂-NH-CH(CH₂COOH)-COOH

A-II-15: HOOCCH(CH₂COOH)-NH-CH₂CH₂OCH₂CH₂OCH₂CH₂-NH-CH(CH₂COOH)-COOH

A-II-16: H₂O₃P-CH(CH₂PO₃H₂)-NH-CH₂CH₂-NH-CH(CH₂PO₃H₂)-PO₃H₂

-continued

-continued

A-III-20: HOOCCH₂–N(CH₂CONH₂)–CH₂CH₂–N(CH₂COOH)(CH₂CONH₂) with H₂NCOCH₂ on left N

A-III-21: H₂NCOCH₂–N(CH₂CONH₂)–CH₂CH₂–N(CH₂CONH₂)₂

A-III-22: HOOCCH₂–N(CH₂CONHCH₃)–CH₂CH₂–N(CH₂COOH)(CH₂CONHCH₃) with H₃CNHCOCH₂ on left N A-III-23: cyclohexane-1,2-diyl bis[N(CH₂COOH)(CH₂CONH₂)] / N(CH₂COOH)(CH₂CONH₂)

A-III-24: HOOCCH₂–N(CH₂CONH₂)–(CH₂)₄–N(CH₂COOH)(CH₂CONH₂)

A-III-25: o-phenylene bis[N(CH₂COOH)(CH₂CONH₂)]

A-III-26: HOOCCH(CH₂CONH₂)NHCH₂CH₂NHCH(CH₂CONH₂)COOH

A-III-27: HOOCCH(CH₂COOH)NHCH₂CH₂NHCH(CH₂COOH)CONH₂ (with H₂NCO... variant)

A-III-28: H₂NCOCH(CH₂CONH₂)NHCH₂CH₂NHCH(CH₂CONH₂)CONH₂

A-III-29: HOOCCH(CH₂CONH₂)NHCH₂CH₂CH₂NHCH(CH₂CONH₂)COOH

A-III-30: H₂NCOCH(CH₂COOH)NHCH₂CH₂CH₂NHCH(CH₂COOH)CONH₂

A-III-31: H₂NCOCH(CH₂CONH₂)NHCH₂CH₂CH₂NHCH(CH₂CONH₂)CONH₂

A-III-32: HOOCCH₂–N(CH₂CONH₂)–CH₂CH₂–N(CH₂COOH)(CH₂COOH)–CH₂CH₂–(CH₂CONH₂)

A-III-33: HO₃SCH₂CH₂NHCOCH₂–N(CH₂COOH)–CH₂CH₂–N(CH₂COOH)(CH₂CONHCH₂CH₂SO₃H)

A-III-34: H₃SCH₂CH₂NHCOCH₂–N(CH₂COOH)–CH₂CH₂–N(CH₂COOH)(CH₂CONHCH₂CH₂SCH₃)

A-III-35: HOOCCH₂–N(CH₂CONH₂)–CH₂CH₂OCH₂CH₂–N(CH₂COOH)(CH₂CONH₂)

A-IV-1: HOOCCH₂–N(H)–CH=CH–N(H)–CH₂COOH with CH₂COOH substituents (trans)

A-IV-2: HOOCCH₂–N(CH₂COOH)–CH=CH–N(CH₂COOH)–CH₂COOH

A-IV-3: HOOCCH₂–N(H)–C(CH₃)=C(CH₃)–N(H)–CH₂COOH with CH₂COOH substituents

A-IV-4: o-phenylene bis[N(CH₂COOH)₂]

A-IV-5: HOOCCH₂–NH–CH=CH–NH–CH₂COOH

A-IV-6: HOOC–CH(NHCH₂–)–(2-hydroxyphenyl)–CH=CH–(2-hydroxyphenyl)–CH(–CH₂NH)–COOH A-IV-7
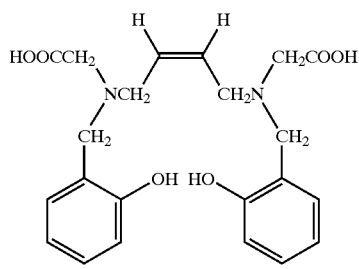

A-IV-8
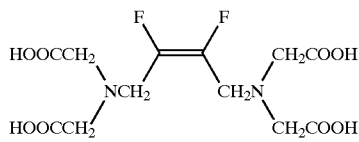

A-IV-9
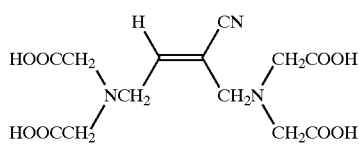

A-IV-10
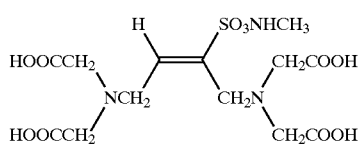

A-IV-11
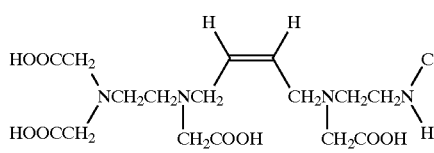

A-IV-12
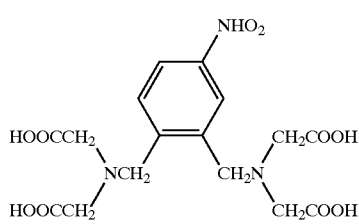

A-IV-13
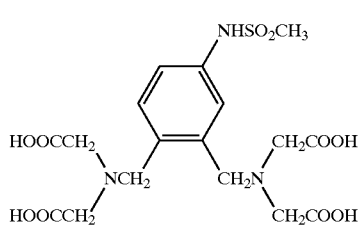

A-IV-14
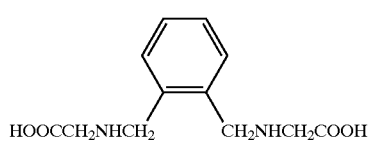

A-IV-15
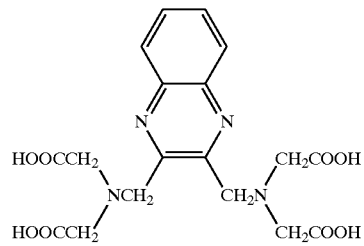

A-IV-16
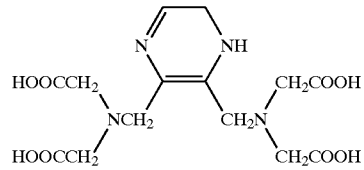

As the aminopolycarboxylic acid relating to the invention, aminopolycarboxylic acids other than the compounds represented by the general formulas [A-I] to [A-IV] described above can be employed:

[A'-1] Ethylenediamine tetraacetic acid
[A'-2] Trans-1,2-cyclohexanediaminetetraacetic acid
[A'-3] Dihydroxyethyl glycine
[A'-4] Ethylenediaminetetrakismethylenephosphonic acid
[A'-5] Nitrotrismethylene phosphonic acid
[A'-6] Diethylenetriaminepentakismethylenephosphonic acid
[A'-7] Diethylenetriaminepentaacetic acid
[A'-8] Ethylenediamindiorthohydroxyphenylacetic acid
[A'-9] Hydroxyethylethylenediaminetriacetic acid
[A'-10] Ethylenediaminepropionic acid
[A'-11] Ethylenediaminediacetatic acid
[A'-12] Hydroxyethyliminodiacetic acid
[A'-13] Nitrilo triacetate
[A'-14] Nitrilotripropionic acid
[A'-15] Triethylenetetraminehexaacetic acid
[A'-16] Ethylenediaminetetrapropionic acid
[A'-17] 1,3-Propylenediaminetetraacetic acid
[A'-18] Glycoletherdiaminetetraacetic acid Further, aminopolycarboxylic acids such as the exemplified compounds 1 to 71 described at pages 7 to 11 of JP-A 4-174432 (the term, JP-A refers to an unexamined and published Japanese Patent Application) and the exemplified compounds 1 to 36 described at pages 25 to 30 of JP-A 4-204533 can also be employed.

Next, the compounds represented by the general formula [2] and [3] described above will be detailed:

General formula [2]

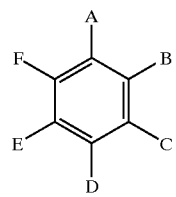

wherein among A to F, at least one represents a sulfonic acid group or a sulfonic acid ester group, and the others represent a hydrogen atom, a halogen atom, a hydroxyl group, a saturated or unsaturated alkyl group;

General formula [3]

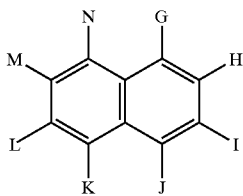

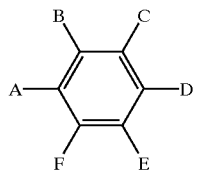

wherein among G to N, at least one represents a sulfonic acid group or a sulfonic acid ester group, and the others represent a hydrogen atom, a halogen atom, a hydroxyl group, a saturated or unsaturated alkyl group.

Next, compounds represented by the general formula [2] or general formula [3] employed in the invention represent the compounds in which a sulfonic acid group or a sulfonic acid ester group is bonded directly to an unsaturated conjugated-ring having aromaticity. The number of the sulfonic acid group or sulfonic acid ester group may be single or plural. The sulfonic acid group and sulfonic acid group include the salt thereof. The salts include salts of an alkali metal such as lithium, sodium or potassium, and an ammonium salt.

In general formula [2] or [3], saturated or unsaturated alkyl groups represented by A to F or G to N preferably have 1 to 10 carbon atoms. The carbon chain may be a straight chain type or a branched chain type.

Specific examples of the compounds represented by the general formula [2] or [3] are shown below, however, they are not limited thereto. Herein, all of these exemplified compounds are shown as sodium salts, however, the part of or all of sulfonic acids or sulfonic acid esters may be salts other than sodium, such as potassium or lithium salt.

| Example compound | A | B | C | D | E | F |
|---|---|---|---|---|---|---|
| 2-1 | H | H | H | —SO$_3$Na | H | H |
| 2-2 | —CH$_3$ | H | H | —SO$_3$Na | H | H |
| 2-3 | H | —CH$_3$ | H | —SO$_3$Na | H | H |
| 2-4 | H | H | —CH$_3$ | —SO$_3$Na | H | H |
| 2-5 | —CH$_2$CH$_3$ | H | H | —SO$_3$Na | H | H |
| 2-6 | —CH$_2$CH$_2$CH$_3$ | H | H | —SO$_3$Na | H | H |
| 2-7 | —C(CH$_3$)HCH$_3$ | H | H | —SO$_3$Na | H | H |
| 2-8 | —C(CH$_3$)3 | H | H | —SO$_3$Na | H | H |
| 2-9 | —CH=CH$_2$ | H | H | —SO$_3$Na | H | H |
| 2-10 | —CH=CHCH$_3$ | H | H | —SO$_3$Na | H | H |
| 2-11 | —C(CH$_3$)=CH$_2$ | H | H | —SO$_3$Na | H | H |
| 2-12 | —Cl | H | H | —SO$_3$Na | H | H |
| 2-13 | —Br | H | H | —SO$_3$Na | H | H |
| 2-14 | —CH$_3$ | H | —CH$_3$ | —SO$_3$Na | H | H |
| 2-15 | —CH$_3$ | H | H | —CH$_3$ | —SO$_3$Na | H |
| 2-16 | —Cl | H | —CH$_3$ | —SO$_3$Na | H | H |
| 2-17 | —CH$_3$ | H | —Cl | —SO$_3$Na | H | H |
| 2-18 | H | H | —SO$_3$Na | H | —SO$_3$Na | H |
| 2-19 | —SO$_3$Na | H | H | —SO$_3$Na | H | H |
| 2-20 | —CH$_3$ | H | —SO$_3$Na | H | —SO$_3$Na | H |
| 2-21 | —CH$_3$ | H | H | —SO$_3$Na | H | H |
| 2-22 | —CH$_3$ | H | —CH$_3$ | —SO$_3$Na | H | H |
| 2-23 | —C$_2$H$_5$ | —H | H | —SO$_3$Na | H | H |
| 2-24 | OH | OH | —SO$_3$Na | —H | —SO$_3$Na | H |

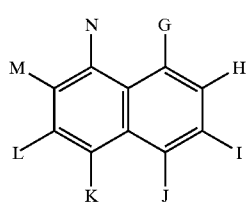

| Example compound | G | H | I | J | K | L | M | N |
|---|---|---|---|---|---|---|---|---|
| 3-1 | —SO$_3$Na | H | H | H | H | H | H | H |
| 3-2 | H | —SO$_3$Na | H | H | H | H | H | H |
| 3-3 | H | —SO$_3$Na | H | H | H | —CH$_3$ | H | H |
| 3-4 | —SO$_3$Na | H | H | H | —SO$_3$Na | H | H | H |
| 3-5 | H | —SO$_3$Na | H | H | H | —SO$_3$Na | H | H |
| 3-6 | H | H | —SO$_3$Na | H | H | —SO$_3$Na | H | —OH |
| 3-7 | H | —SO$_3$Na | H | —SO$_3$Na | H | H | H | H |
| 3-8 | —SO$_3$Na | H | H | H | H | —SO$_3$Na | H | H |
| 3-9 | H | H | —SO$_3$Na | H | H | —SO$_3$Na | H | H |
| 3-10 | H | H | —SO$_3$H | H | H | —SO$_3$H | H | H |
| 3-11 | H | —SO$_3$Na | H | H | H | —SO$_3$Na | H | —Cl |
| 3-12 | H | H | —SO$_3$Na | H | H | —Cl | H | H |
| 3-13 | H | H | —OSO$_3$Na | H | H | —OSO$_3$Na | H | H |
| 3-14 | —OSO$_3$Na | H | —OSO$_3$Na | H | H | —OSO$_3$Na | H | H |
| 3-15 | —OH | H | —SO$_3$Na | H | H | —SO$_3$Na | H | —OH |

Next, compounds represented by the general formula [4] described above will be detailed:

$$R_{41}\text{—}SO_3M \qquad \text{General formula [4]}$$

wherein $R_{41}$ represents a substituted or unsubstituted, saturated or unsaturated hydrocarbon group having 1 to 20 carbon atoms; and M represents a hydrogen atom, or an alkali metal such as potassium, sodium or lithium. As the substituent for $R_{41}$, a sulfonic acid group, a hydroxyl group, an amino group, a carbonic acid group, an alkoxy group, an alkyl group and an alkylene group are listed.

Next, among compounds represented by the general formula [4], specific example compounds preferably employed in the invention will be shown.

(4-1) Methanesulfonic acid
(4-2) Ethanesulfonic acid
(4-3) Sodium allylsulfonate
(4-4) n-Propanesulfonic acid
(4-5) iso-Propylsulfonic acid
(4-6) Vinylsulfonic acid
(4-7) Sodium n-hexanesulfonate
(4-8) Sodium n-octanesulfonate
(4-9) Sodium n-octane-1,8-disulfonate
(4-10) Potassium dodecylsulfonate
(4-11) Sodium 1-carboxy-n-octane-8-sulfonate
(4-12) Sodium 2-methyl-2-propene-1-sulfonate Next, compounds represented by the general formula [5] described above will be detailed:

$$\text{HO—}(A_1\text{—O})l_1\text{—}(A_2\text{—O})l_2\text{—}(A_3\text{—O})l_3\text{—H} \qquad \text{General formula [5]}$$

wherein $A_1$, $A_2$, and $A_3$ each represent a substituted or unsubstituted, straight chain or branched alkylene group, which may be the same or different; "$l_1$", "$l_2$", and "$l_3$" each represent 0 or an integer from 1 to 500.

Further, as the substituents, a hydroxyl group, a carboxyl group, a sulfonyl group, an alkoxy group, a carbamoyl group and a sulfamoyl group are listed. Preferably employed are the compounds in which $A_1$, $A_2$, and $A_3$ each are unsubstituted. And, most preferable are the compounds in which $A_1$, $A_2$, and $A_3$ are —CH$_2$CH$_2$— or —CH(CH$_3$)—CH$_2$—.

"$l_1$", "$l_2$", and "$l_3$" each represent 0 or an integer from 1 to 500, provided that "$l_1$"+"$l_2$"+"$l_3$"≧1.

Further, when the compounds represented by the general formula [5] in the invention are copolymers obtained through copolymerization of, for example, two kinds of monomers, A and B; those having the following arrangements are also included:

—A—B—A—B—A—B—A—B—A—B—,
—A—A—B—A—B—B—A—A—A—B—A—A—B—B—A—, and
—A—A—A—A—A—A—B—B—B—B—B—B—A—A—A—A—A—.

Among these copolymers, specifically preferable compounds are block-polymers (Pluronic type nonion) of ethylene glycol and propylene glycol represented by the following general formula [5']:

$$\text{HO—}(CH_2CH_2\text{—O})l_4\text{—}(CH(CH_3)CH_2\text{—O})l_5\text{—}(CH_2CH_2\text{—O})l_6\text{—H} \qquad \text{General formula [5']}$$

wherein "$l_4$", "$l_5$", and "$l_6$" are the same as defined in "$l_1$", "$l_2$", and "$l_3$" in the general formula [5] described above.

In the compounds represented by the general formula [5'] of the invention, the content of ethyleneoxide (weight %) is preferably not less than 70 weight %, and specifically preferably not less than 80 weight, based on the total molecular weight.

Preferable specific examples of the compounds represented by the general formula [5] described above are as follows:

(5-1)
HO—CH$_2$CH$_2$—OH (5-2)
HO—CH(CH$_3$)CH$_2$—OH (5-3)
HO—C(CH$_3$)(CH$_3$)—CH$_2$—OH (5-4)
HO—CH(CH$_3$)CH(CH$_3$)—OH

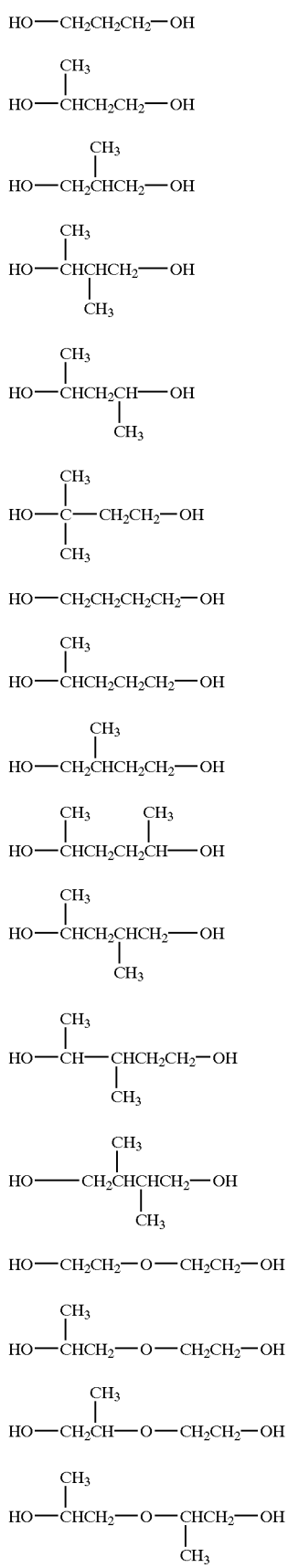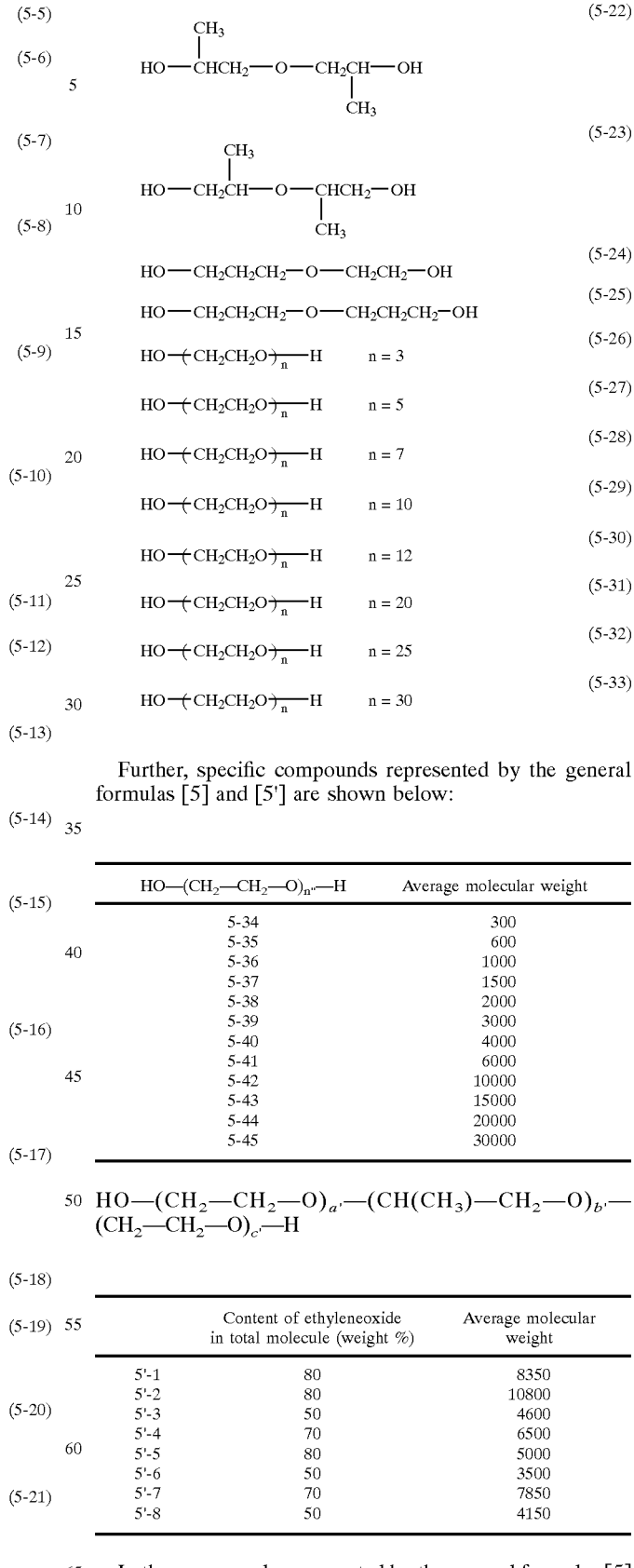

Further, specific compounds represented by the general formulas [5] and [5'] are shown below:

| HO—(CH$_2$—CH$_2$—O)$_{n''}$—H | Average molecular weight |
|---|---|
| 5-34 | 300 |
| 5-35 | 600 |
| 5-36 | 1000 |
| 5-37 | 1500 |
| 5-38 | 2000 |
| 5-39 | 3000 |
| 5-40 | 4000 |
| 5-41 | 6000 |
| 5-42 | 10000 |
| 5-43 | 15000 |
| 5-44 | 20000 |
| 5-45 | 30000 |

$$HO-(CH_2-CH_2-O)_{a'}-(CH(CH_3)-CH_2-O)_{b'}-(CH_2-CH_2-O)_{c'}-H$$

| | Content of ethyleneoxide in total molecule (weight %) | Average molecular weight |
|---|---|---|
| 5'-1 | 80 | 8350 |
| 5'-2 | 80 | 10800 |
| 5'-3 | 50 | 4600 |
| 5'-4 | 70 | 6500 |
| 5'-5 | 80 | 5000 |
| 5'-6 | 50 | 3500 |
| 5'-7 | 70 | 7850 |
| 5'-8 | 50 | 4150 |

In the compounds represented by the general formulas [5] and [5'] of the invention, polyethylene glycol (being also referred to as PEG) is most preferable.

In the case of the compound being polyethylene glycol, its average molecular weight is preferably within a range of from 2000 to 20000, and specifically preferably within a range of from 3000 to 15000.

Herein, the average molecular weight in the invention is a molecular weight calculated according to a hydroxyl value.

The compounds represented by the general formula [5] described above may be employed alone or in combinations of two or more kinds thereof.

Next, the compounds represented by the general formula [6] described above will be detailed:

General formula [6]

wherein $R_1$ represents a substituted or unsubstituted hydroxyalkyl group or an substituted or unsubstituted aminoalkyl group; and $R_2$ and $R_3$ each represent a hydrogen atom, an alkyl group, a hydroxyalkyl group or a benzyl group, provided that $R_1$ and $R_2$, $R_2$ and $R_3$, $R_3$ and $R_1$, or, $R_1$, $R_2$ and $R_3$ each may form a ring.

In the general formula [6], $R_1$ represents a hydroxyalkyl group or aminoalkyl group, which may be substituted, the number of carbon atoms of the hydroxyalkyl group and aminoalkyl group being preferably 1 to 10, and more preferably 2 to 6. Examples of the substituent include a hydroxyl group, a carboxyl group, a carbonyl group, a sulfo group, a phosphono group, an ammonium group, a nitro group, an amino group and a halogen atom. $R_2$ and $R_3$ each include a hydrogen atom, an alkyl group which may be substituted and a benzyl group which may be substituted, and preferable are a hydrogen atom or a straight or branched alkyl group having 1 to 10 carbon atoms, which may be substituted by a substituent.

Examples of the substituent include a hydroxyl group, a carboxyl group, an alkoxycarbonyl group, an acylamino group, a carbamoyl group, an ureido group, an acyl group, a cyano group, a nitro group, an amino group, a sulfo group, an alkylsulfonyl group, an alkylsulfonylamino group, an arylsulfonyl group, an arylsulfonylamino group, a phosphono group, a phosphonic acid ester residual group, and a halogen atom. Preferable are a hydroxyl group, a carboxyl group, an alkoxycarbonyl group, a carbamoyl group and an amino group, and these may be further substituted by a hydroxyl, carboxyl sulfo or amino group.

$R_1$ and $R_2$, $R_2$ and $R_3$, $R_3$ and $R_1$, or, $R_1$, $R_2$ and $R_3$ each may bond together with each other to form a ring.

The preferable specific examples of the compounds represented by the general formula [6] described above are shown below but are not limited thereto.

(6-1) Ethanolamine
(6-2) Diethanolamine
(6-3) Triethanolamine
(6-4) Di-isopropanolamine
(6-5) 2-Methylaminoethanol
(6-6) 2-Ethylaminoethanol
(6-7) 2-Dimethylaminoethanol
(6-8) 2-Diethylaminoethanol
(6-9) 1-Diethylamino-2-propanol
(6-10) 3-Diethylamino-1-propanol
(6-11) 3-Dimethylamino-1-propanol
(6-12) Isopropylaminoethanol
(6-13) 3-Amino-1-propanol
(6-14) 2-Amino-2-methyl-1,3-propanediol
(6-15) Ethylenediamine tetraisopropanol
(6-16) Benzylethanolamine
(6-17) 2-Amino-2-(hydroxymethyl)-1,3-propanediol
(6-18) 1,3-Diaminopropanol
(6-19) 1,3-Bis(2-hydroxyethylmethylamino)-propanol
(6-20) Triisopropanolamine The compounds represented by the general formula [7] and the general formula [8], described above, will be detailed.

$$A—O—(B)_m—(C)_n—X \qquad \text{General formula [7]}$$

$$A—O—(CH_2CH_2O)_n—SO_3M \qquad \text{General formula [8]}$$

In the general formula [7], "A" represents a monovalent organic group, for example, an alkyl group having 6 to 50 carbon atoms, preferably 6 to 35 carbon atoms (such as hexyl, heptyl, octyl, nonyl, decyl, undecyl or dodecyl); or an aryl group substituted by an alkyl group having 1 to 35 carbon atoms, or by an alkenyl group having 2 to 35 carbon atoms. The preferable substituents on the aryl group include an alkyl group having 1 to 18 carbon atoms (for example, an unsubstituted alkyl group such as methyl, propyl, butyl, pentyl, hexyl, heptyl, octyl, nonyl, decyl, undecyl or dodecyl), a substituted alkyl group such as benzyl and phenetyl, or an alkenyl group having 2 to 20 carbon atoms (for example, an unsubstituted alkenyl group such as an oleyl, cetyl and allyl group).

As the aryl group, a phenyl, biphenyl or naphtyl group is listed, and preferable is a phenyl group. The substituting position on the aryl group may be any of ortho, metha and para, and plural groups can substitute. B and C respectively represent,

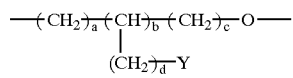

and these may be the same or different, in which "a", "b" and "c" each are 0, 1, 2 or 3, "d" is 0 or 1, and Y is a hydrogen atom or a hydroxyl group); "m" and "n" represent an integer from 1 to 100. X is a hydrogen atom, an alkyl group, an alalkyl group or an aryl group, and includes, for example, the groups explained in "A".

In the general formula [8], M represents an alkali metal (for example, Na, K, Li, etc.), a hydrogen atom, an ammonium salt or an alkanolamine salt, "n" is an integer from 1 to 100, and "A" represents a monovalent organic group, for example, an alkyl group having 6 to 20 carbon atoms, preferably 6 to 12 carbon atoms (such as hexyl, heptyl, octyl, nonyl, decyl, undecyl or dodecyl); or an aryl group substituted by an alkyl group having 3 to 20 carbon atoms, and the preferable substituents include an alkyl group having 3 to 12 carbon atoms (for example, such as a propyl, butyl, pentyl, hexyl, heptyl, octyl, nonyl, decyl, undecyl or dodecyl group).

As the aryl group, a phenyl, tolyl, xylyl, biphenyl or naphtyl group is listed, and preferable is a phenyl group or a tolyl group. The position of the aryl group at which an alkyl group bonds may be any of ortho, meta and para positions.

Examples of the compounds represented by the general formulas [7] and [8] are listed below, however, they are not limited thereby.

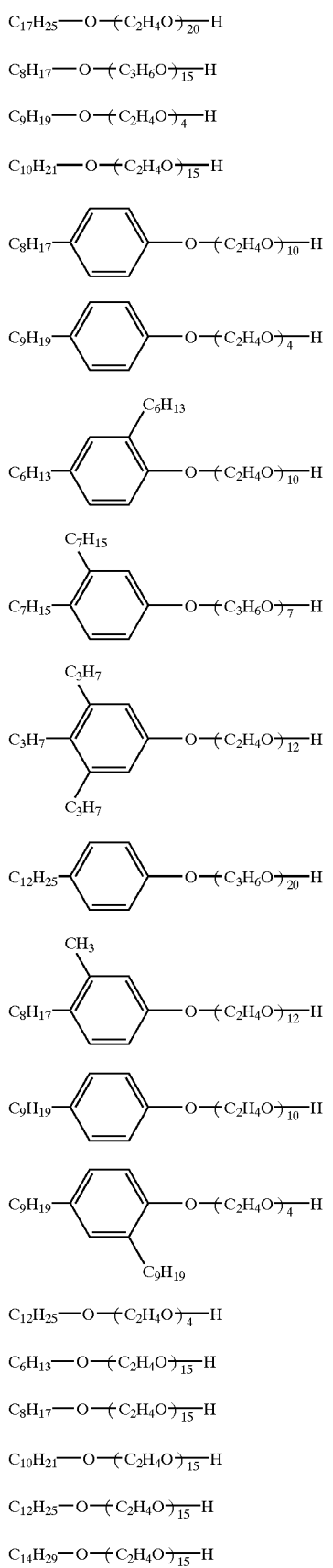
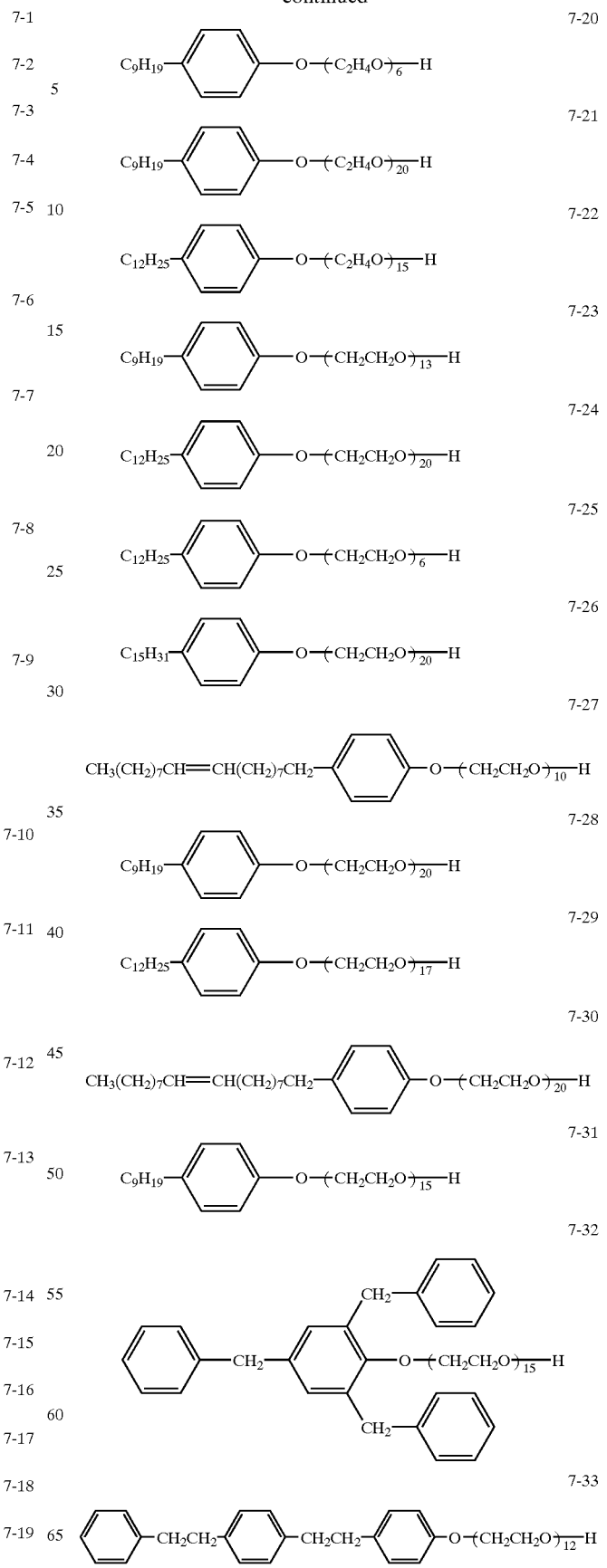

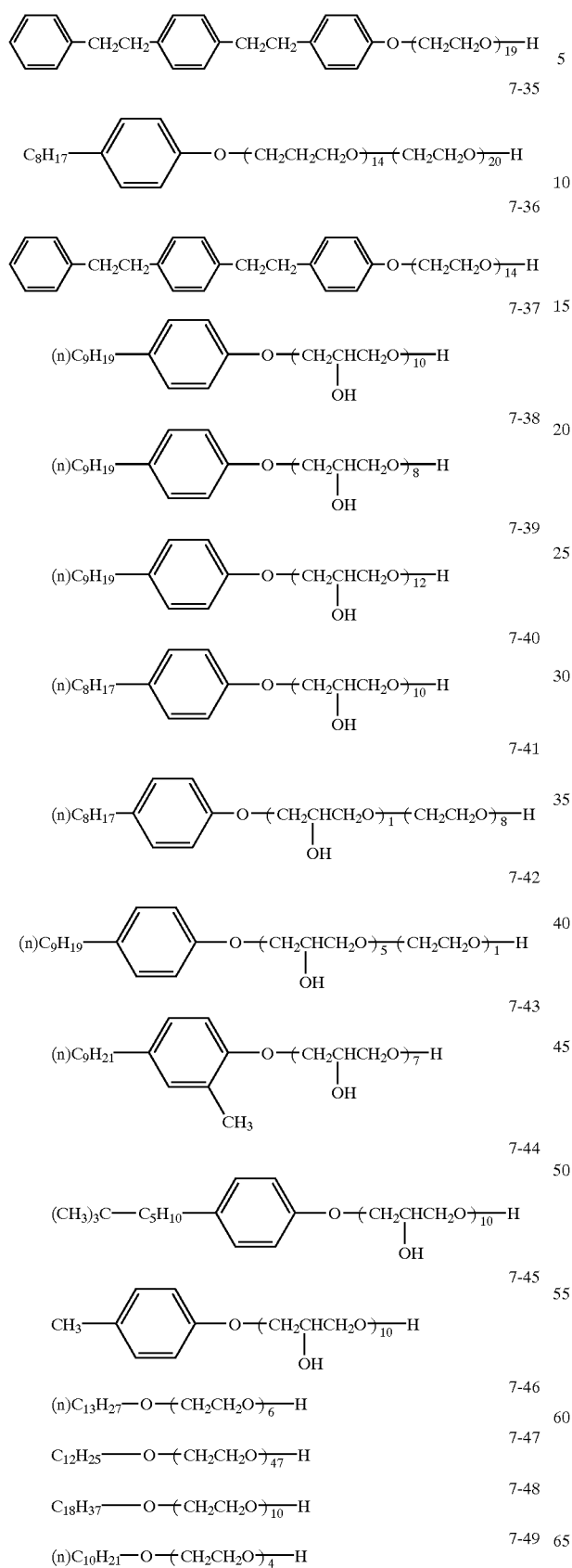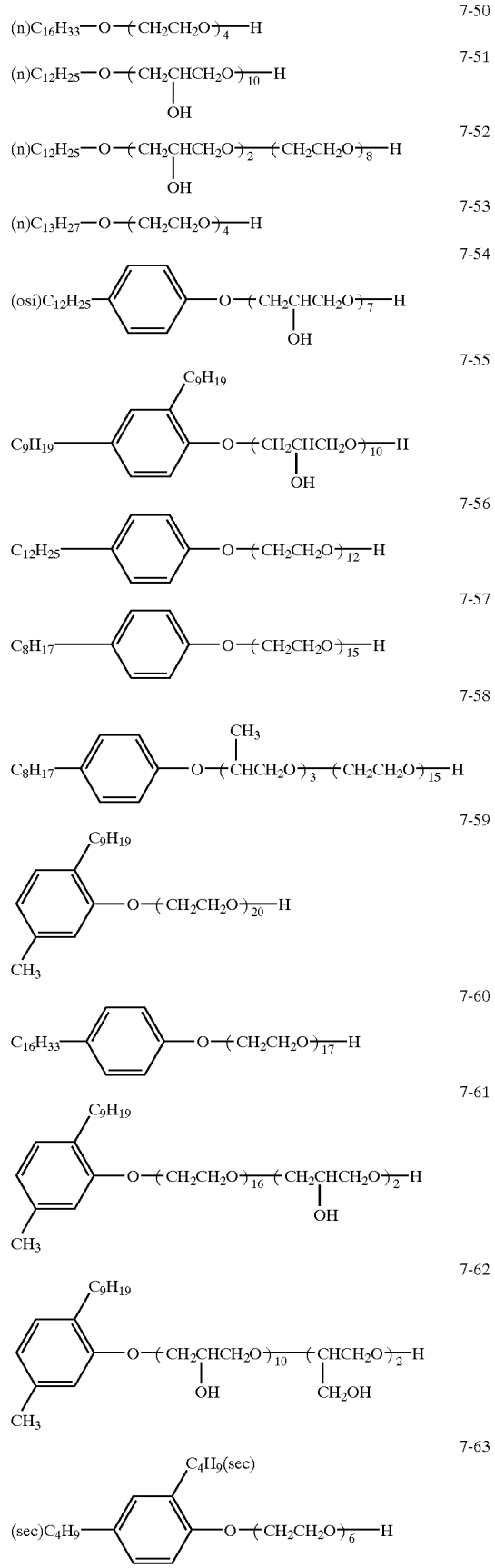

7-64
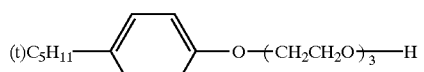

7-65
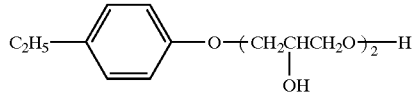

7-66
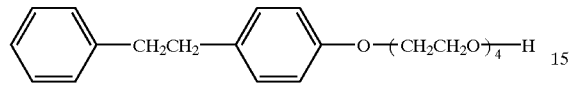

7-67
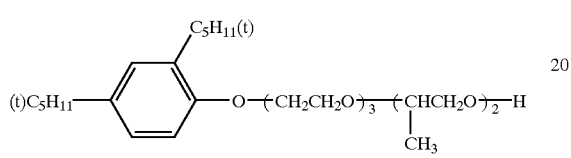

7-68
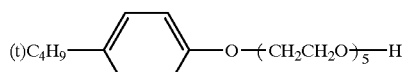

7-69
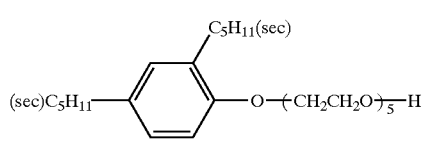

7-70
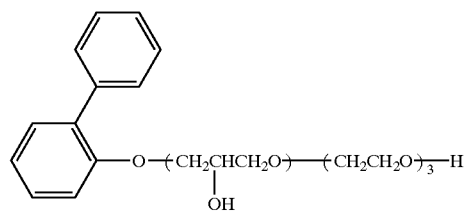

7-71
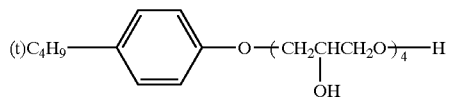

7-72
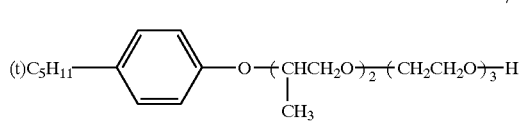

7-73
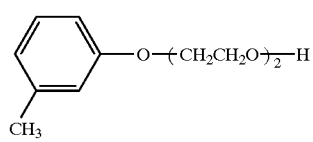

7-74
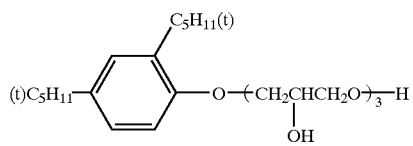

7-75
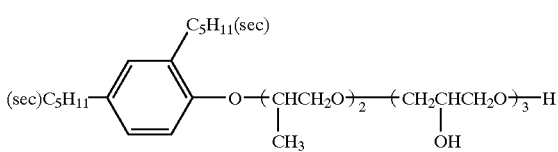

7-76
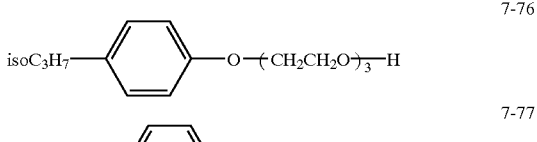

7-77
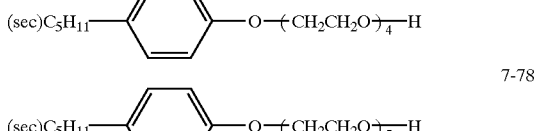

7-78
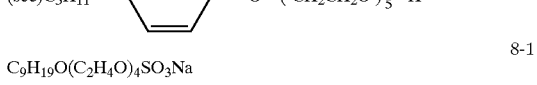

8-1
$C_9H_{19}O(C_2H_4O)_4SO_3Na$ 8-2
$C_{10}H_{21}O(C_2H_4O)_{15}SO_3Na$ 8-3
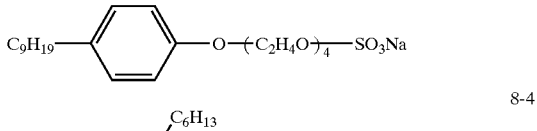

8-4
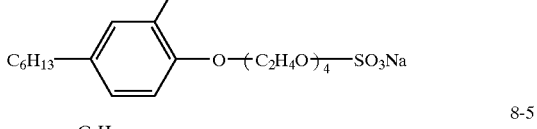

8-5
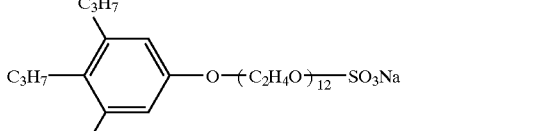

8-6

8-7
$C_{12}H_{25}O\text{---}(C_2H_4O)_4\text{---}SO_3Na$ 8-8
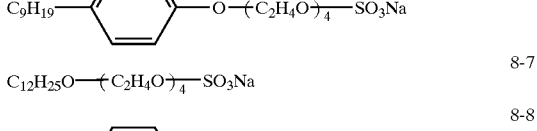

8-9
$C_{18}H_{37}O\text{---}(C_2H_4O)_{23}\text{---}SO_3Na$

Among the exemplified compounds described above, compounds 7-23, 7-28, 7-31, 7-32, 7-33, 7-34, 7-36, 7-37, 7-47, 8-8 and 8-9 are preferable.

Next, the polyethyleneoxide sorbitan and derivatives thereof described above will be detailed.

Polyethyleneoxide sorbitan and derivatives thereof used in the invention refer to compounds in which polyethyleneoxide is added to sorbitan and compounds derived from the polyethylene oxide sorbitan. As the derivative of polyethyleneoxide sorbitan, a sorbitan fatty acid ester can be exemplified. Such materials are commercially available, and include, for example, polyoxyethylene sorbitan monoolate (Product name: Nonion OT-221, manufactured by NIPPON YUSHI Co., Ltd.) and TWEEN80, manufactured by ICI Co.

The compounds represented by the general formulas [1] to [6] and aminopolycarboxylic acids described above are employed in an amount of 1 to 30 weight %, and more remarkable effect of the invention is performed when they are employed in an amount of from 3 to 20 weight %. Further, the compounds represented by the general formula [7] or [8], polyethyleneoxide sorbitan or derivatives thereof are employed in an amount of 0.2 to 10 weight %, and more remarkable effect of the invention is performed when they are employed in an amount of 0.4 to 5 weight %.

Further, the hydroxylamine salt aqueous solution according to the invention is employed at a pH of from 2 to 6, and more preferably within a pH range of from 2.5 to 4.5 to achieve more remarkable effect of the invention.

The hydroxylamine salts relating to the invention refers to salts of an inorganic or organic acid and a hydroxylamine, such as hydroxylamine sulfate, hydroxylamine nitrate, hydroxylamine phosphate, hydroxylamine oxalate, hydroxylamine citrate or hydroxylamine chlorate.

In the invention, by storing a hydroxylamine salt solution in a plastic container having an oxygen permeation coefficient of not more than 40 ml/m$^2$·atm·day (at a temperature of 20° C. and a relative humidity of 65%), and more preferably of not more than 20 ml/m$^2$·atm·day, the effect of the invention is more remarkably performed.

The oxygen permeation coefficient of plastic container in the invention can be determined by the method described in "O$_2$ permeation of plasticcontainer, Modern Packing; N.J.Calyay, 1968" Dec. issue, pages 143 to 145.

As plastic package material forming the containers, there can be employed in the invention, for example, a sheet comprised of plastic having a small oxygen permeation coefficient such as polyvinylidene chloride, nylon, saponified copolymer of ethylene-vinyl acetate, polyvinyl alcohol, polyvinyl chloride; a sheet in which a metal foil such as aluminum is laminated thereto or metal such as aluminum is evaporated thereto; or a laminated sheet in which a sheet comprised of polyethylene or an ethylene-vinyl acetate copolymer is pasted up further thereto. Further, these sheets may be employed alone or in combinations of plural sheets to form containers.

Of these plastic package materials, specifically preferably employed is polyvinylidene chloride, nylon or a saponified ethylene-vinyl acetate copolymer, in terms of minimized oxygen permeation coefficient, enhanced strength in the container form, and easy convertibility to containers.

The form of the container is not specifically limited, including, for example, a bottle type, a cubic type, a pillow type, etc. For example, to obtain a cubic type container, the plastic materials described above may concurrently be extruded to be formed into a laminated material. Specifically preferable is a flexible pillow type container, in terms of compactness and easy handling.

When the outer wall of a container is constituted by one sheet, an oxygen permeability coefficient of the sheet is not more than 40 ml/m$^2$·atm·day as described above preferably, however, when the outer wall of a container is constituted by two sheets, it will do that an oxygen permeation coefficient of the total of said two sheets as a whole is not more than 40 ml/m$^2$·atm·day. As the sheet constituting said outer wall can be employed a single-layered plastic sheet or a multi-layered plastic sheet in which plural plastic sheets are pasted up together. Further, the plastic sheet may be a sheet comprised of a plastic sheet alone, a sheet which is laminated with such as a metal foil or paper, or a sheet comprised of a plastic sheet provided with an evaporated metal film.

The single-layered plastic sheet includes, for example, a plastic sheet comprised of such as polyvinylidene chloride, nylon, a saponified ethylene-vinyl acetate copolymer, polyvinyl alcohol or polyvinylidene chloride; a sheet in which a metal foil comprised of such as aluminum, or paper is laminated thereto; or a sheet in which metal such as aluminum is evaporated onto the plastic sheet described above. The multi-layer sheet in which plural plastic sheets are pasted up together includes, for example, a 3-layer lamination of polyethylene terephthalate/polyvinyl alcohol.ethylene copolymer/polyethylene, a 3-layer lamination of stretched polypropylene/polyvinyl alcohol.ethylene copolymer/polyethylene, a 3-layer lamination of unstretched polypropylene/polyvinyl alcohol.ethylene copolymer/polyethylene, a 3-layer lamination of nylon/aluminum foil/polyethylene, a 3-layer lamination of polyethylene terephthalate/aluminum foil/polyethylene, a 4-layer lamination of cellophane/polyethylene/aluminum foil/polyethylene, a 3-layer lamination of aluminum foil/paper/polyethylene, a 4-layer lamination of polyethylene terephthalate/polyethylene/aluminum foil/polyethylene, a 4-layer lamination of nylon/polyethylene/aluminum foil/polyethylene, a 4-layer lamination of paper/polyethylene/aluminum foil/polyethylene, a 4-layer lamination of polyethylene terephthalate/aluminum foil/polyethylene terephthalate/polypropylene, a 4-layer lamination of polyethylene terephthalate/aluminum foil/polyethylene terephthalate/high density polyethylene, a 4-layer lamination of polyethylene terephthalate/aluminum foil/polyethylene/low density polyethylene, a 2-layer lamination of polyvinyl alcohol.ethylene copolymer/polypropylene, a 3-layer lamination of polyethylene terephthalate/aluminum foil/polypropylene, or a 3-layer lamination of paper/aluminum foil/polyethylene, and specifically preferably a 4-layer lamination of polyethylene/nylon coverd with polyvinylidene chloride/polyethylene/ethylvinyl acetate -polyethylene condensation product, a 3-layer lamination of polyethylene/nylon covered with polyvinylidene chloride/polyethylene, a 5-layer lamination of ethylvinyl acetate- .polyethylene condensation product/polyethylene/aluminum evaporated nylon/polyethylene/ethylvinyl acetate.polyethylene condensation product, a 4-layer lamination of aluminum evaporated nylon/nylon/polyethylene/ethylvinyl acetate- .polyethylene condensation product, a 3-layer lamination of stretched polypropylene/nylon coverd with polyvinylidene chloride/polyethylene, a 5-layer lamination of polyethylene/nylon covered with polyvinylidene chloride/polyethylene/nylon covered with polyvinylidene chloride/polyethylene, a 3-layer lamination of stretched polypropylene/polyvinylalcohol.ethylene copolymer/low density polyethylene, a 3-layer lamination of stretched polypropylene/polyvinylalcohol.ethylene copolymer/unstretched polypropylene, a 3-layer lamination of polyethylene terephthalate/polyvinylalcohol.ethylene copolymer/low density polyethylene or a 3-layer lamination of unstretched nylon/polyvinylalcohol.ethylene copolymer/low density polyethylene.

Further, in cases where the container is formed of a multi-layered plastic sheet, which is comprised of a plastic sheet having an oxygen permeability coefficient of not more than 40 ml/m$^2$·atm·day being laminated with a plastic sheet comprised of, for example, polyethylene or an ethylene-vinyl acetate copolymer which have a large oxygen permeation coefficient but a high flexibility; containers exhibiting sufficient oxygen-impermeability as well as superior durability causing few pin holes can be obtained.

The thickness of a sheet forming the outer wall of containers varies depending on constitution material and cannot be defined unequivocally, however, preferable is approximately from 5 to 1500 μm, and specifically preferably 10 to 500 μm.

EXAMPLES

The present invention will be concretely explained, based on examples below, however, embodiments of the invention are not limited thereby.

Example 1

Hydroxylamine sulfate and additives, as described in Tables 1 to 4 were dissolved in water and the pH was adjusted, as shown in Tables 1 to 4 by use of 30 weight % sulfuric acid and 30 weight % potassium hydroxide to prepare the experimental sample solutions.

Each sample solution was divided in two equal parts, one part is sealed into a plastic bottle and kept at from 2 to 40° C. for a week, and crystal precipitation state in the sample solution was observed. Further, the other part is similarly sealed into another plastic bottle and kept at 50° C. for a week, and the residual hydroxylamine sulfate content was determined.

The results are summarized in tables 1 to 4 below.

TABLE 1

| Experiment No. | HAS concentration (weight %) | Additive (weight %) | pH | Storage at low temperatures (Precipitation property) | Storage at high temperatures: Residual ratio of HAS (%) | Remark |
| --- | --- | --- | --- | --- | --- | --- |
| 1-1  | 20 | Non(0)      | 3.0 | B      | 73 | Comp. |
| 1-2  | 20 | OPD262(9.8) | 3.0 | C      | 72 | Comp.* |
| 1-3  | 20 | A-II-1(5)   | 3.0 | A      | 96 | Inv. |
| 1-4  | 20 | A-I-2(5)    | 3.0 | A      | 96 | Inv. |
| 1-5  | 20 | A-III-1(5)  | 3.0 | A      | 95 | Inv. |
| 1-6  | 20 | A-IV-4(5)   | 3.0 | A      | 94 | Inv. |
| 1-7  | 20 | A'-1(5)     | 3.0 | A      | 90 | Inv. |
| 1-8  | 20 | A7-7(5)     | 3.0 | A      | 92 | Inv. |
| 1-9  | 20 | I-1(5)      | 3.0 | A      | 98 | Inv. |
| 1-10 | 15 | A-II-1(5)   | 3.0 | B      | 75 | Comp. |
| 1-11 | 18 | A-II-1(5)   | 3.0 | A      | 86 | Inv. |
| 1-12 | 20 | A-II-1(5)   | 3.0 | A      | 95 | Inv. |
| 1-13 | 25 | A-II-1(5)   | 3.0 | A      | 96 | Inv. |
| 1-14 | 30 | A-II-1(5)   | 3.0 | B to A | 95 | Inv. |
| 1-15 | 35 | A-II-1(5)   | 3.0 | B      | 92 | Inv. |
| 1-16 | 38 | A-II-1(5)   | 3.0 | C      | 90 | Comp. |
| 1-17 | 42 | A-II-1(5)   | 3.0 | C      | 88 | Comp. |
| 1-18 | 20 | A-II-1(0.7) | 3.0 | B      | 76 | Comp. |
| 1-19 | 20 | A-II-1(1)   | 3.0 | B to A | 86 | Inv. |
| 1-20 | 20 | A-II-1(3)   | 3.0 | A      | 90 | Inv. |
| 1-21 | 20 | A-II-1(5)   | 3.0 | A      | 95 | Inv. |
| 1-22 | 20 | A-II-1(10)  | 3.0 | A      | 96 | Inv. |
| 1-23 | 20 | A-II-1(30)  | 3.0 | B      | 96 | Inv. |
| 1-24 | 20 | A-II-1(35)  | 3.0 | C      | 97 | Comp. |
| 1-25 | 20 | A-II-1(40)  | 3.0 | C      | 97 | Comp. |
| 1-26 | 20 | A-II-1(5)   | 1.5 | C      | 96 | Comp. |
| 1-27 | 20 | A-II-1(5)   | 2.0 | A      | 96 | Inv. |
| 1-28 | 20 | A-II-1(5)   | 3.0 | A      | 95 | Inv. |
| 1-29 | 20 | A-II-1(5)   | 5.0 | A      | 90 | Inv. |
| 1-30 | 20 | A-II-1(5)   | 6.0 | A      | 85 | Inv. |
| 1-31 | 20 | A-II-1(5)   | 6.5 | B      | 74 | Comp. |
| 1-32 | 20 | A-II-1(5)   | 7.0 | C      | 68 | Comp. |

TABLE 2

| Experiment No. | HAS concentration (weight %) | Additive (weight %) | pH | Storage at low temperatures (Precipitation property) | Storage at high temperatures: Residual ratio of HAS (%) | Remarks |
| --- | --- | --- | --- | --- | --- | --- |
| 2-1  | 20 | 2-2(5)   | 3.0 | A      | 90 | Inv. |
| 2-2  | 20 | 3-9(5)   | 3.0 | A      | 89 | Inv. |
| 2-3  | 20 | 4-3(5)   | 3.0 | A      | 90 | Inv. |
| 2-4  | 15 | 2-2(5)   | 3.0 | B      | 76 | Comp. |
| 2-5  | 18 | 2-2(5)   | 3.0 | A      | 87 | Inv. |
| 2-6  | 20 | 2-2(5)   | 3.0 | A      | 90 | Inv. |
| 2-7  | 25 | 2-2(5)   | 3.0 | A      | 92 | Inv. |
| 2-8  | 30 | 2-2(5)   | 3.0 | A      | 91 | Inv. |
| 2-9  | 35 | 2-2(5)   | 3.0 | A      | 89 | Inv. |
| 2-10 | 38 | 2-2(5)   | 3.0 | C      | 84 | Comp. |
| 2-11 | 42 | 2-2(5)   | 3.0 | C      | 82 | Comp. |
| 2-12 | 20 | 2-2(0.7) | 3.0 | B      | 74 | Comp. |
| 2-13 | 20 | 2-2(1)   | 3.0 | B to A | 84 | Inv. |
| 2-14 | 20 | 2-2(3)   | 3.0 | A      | 88 | Inv. |
| 2-15 | 20 | 2-2(5)   | 3.0 | A      | 90 | Inv. |
| 2-16 | 20 | 2-2(10)  | 3.0 | A      | 91 | Inv. |

TABLE 2-continued

| Experiment No. | HAS concentration (weight %) | Additive (weight %) | pH | Storage at low temperatures (Precipitation property) | Storage at high temperatures: Residual ratio of HAS (%) | Remarks |
|---|---|---|---|---|---|---|
| 2-17 | 20 | 2-2(30) | 3.0 | A | 91 | Inv. |
| 2-18 | 20 | 2-2(35) | 3.0 | B to C | 90 | Comp. |
| 2-19 | 20 | 2-2(40) | 3.0 | C | 88 | Comp. |
| 2-20 | 20 | 2-2(5) | 1.5 | C | 85 | Comp. |
| 2-21 | 20 | 2-2(5) | 2.0 | A | 89 | Inv. |
| 2-22 | 20 | 2-2(5) | 3.0 | A | 90 | Inv. |
| 2-23 | 20 | 2-2(5) | 5.0 | A | 88 | Inv. |
| 2-24 | 20 | 2-2(5) | 6.0 | A | 85 | Inv. |
| 2-25 | 20 | 2-2(5) | 6.5 | B | 72 | Comp. |
| 2-26 | 20 | 2-2(5) | 7.0 | C | 66 | Comp. |

TABLE 3

| Experiment No. | HAS concentration (weight %) | Additive (weight %) | pH | Storage at low temperatures (Precipitation property) | Storage at high temperatures: Residual ratio of HAS (%) | Remarks |
|---|---|---|---|---|---|---|
| 3-1 | 20 | 5-18(5) | 3.0 | A | 88 | Inv. |
| 3-2 | 20 | 5-28(5) | 3.0 | A | 87 | Inv. |
| 3-3 | 20 | 5-7(5) | 3.0 | A | 89 | Inv. |
| 3-4 | 20 | 6-3(5) | 3.0 | A | 88 | Inv. |
| 3-5 | 20 | 6-20(5) | 3.0 | A | 90 | Inv. |
| 3-6 | 10 | 6-20(5) | 3.0 | B | 70 | Comp. |
| 3-7 | 18 | 6-20(5) | 3.0 | A | 86 | Inv. |
| 3-8 | 20 | 6-20(5) | 3.0 | A | 91 | Inv. |
| 3-9 | 25 | 6-20(5) | 3.0 | A | 91 | Inv. |
| 3-10 | 30 | 6-20(5) | 3.0 | A | 90 | Inv. |
| 3-11 | 35 | 6-20(5) | 3.0 | B to A | 88 | Inv. |
| 3-12 | 38 | 6-20(5) | 3.0 | C | 80 | Comp. |
| 3-13 | 42 | 6-20(5) | 3.0 | C | 76 | Comp. |
| 3-14 | 20 | 6-20(0.7) | 3.0 | B | 72 | Comp. |
| 3-15 | 20 | 6-20(1) | 3.0 | B to A | 86 | Inv. |
| 3-16 | 20 | 6-20(3) | 3.0 | A | 90 | Inv. |
| 3-17 | 20 | 6-20(5) | 3.0 | A | 91 | Inv. |
| 3-18 | 20 | 6-20(10) | 3.0 | A | 91 | Inv. |
| 3-19 | 20 | 6-20(30) | 3.0 | A | 90 | Inv. |
| 3-20 | 20 | 6-20(35) | 3.0 | B to C | 74 | Comp. |
| 3-21 | 20 | 6-20(40) | 3.0 | B to C | 70 | Comp. |
| 3-22 | 20 | 6-20(5) | 1.5 | B to C | 72 | Comp. |
| 3-23 | 20 | 6-20(5) | 2.0 | A | 87 | Inv. |
| 3-24 | 20 | 6-20(5) | 3.0 | A | 91 | Inv. |
| 3-25 | 20 | 6-20(5) | 5.0 | A | 91 | Inv. |
| 3-26 | 20 | 6-20(5) | 6.0 | A | 89 | Inv. |
| 3-27 | 20 | 6-20(5) | 6.5 | B | 69 | Comp. |
| 3-28 | 20 | 6-20(5) | 7.0 | C | 65 | Comp. |

TABLE 4

| Experiment No. | HAS concentration (weight %) | Additive (weight %) | pH | Storage at low temperatures (Precipitation property) | Storage at high temperatures: Residual ratio of HAS (%) | Remarks |
|---|---|---|---|---|---|---|
| 4-1 | 20 | 7-23(5) | 3.0 | A | 86 | Inv. |
| 4-2 | 20 | 7-33(5) | 3.0 | A | 87 | Inv. |
| 4-3 | 20 | 8-8(2) | 3.0 | A | 87 | Inv. |
| 4-4 | 20 | 8-9(2) | 3.0 | A | 89 | Inv. |
| 4-5 | 20 | Tween80(2) | 3.0 | A | 88 | Inv. |
| 4-6 | 10 | 8-9(2) | 3.0 | A | 72 | Comp. |
| 4-7 | 18 | 8-9(2) | 3.0 | A | 85 | Inv. |
| 4-8 | 20 | 8-9(2) | 3.0 | A | 87 | Inv. |
| 4-9 | 25 | 8-9(2) | 3.0 | A | 89 | Inv. |
| 4-10 | 30 | 8-9(2) | 3.0 | A | 90 | Inv. |
| 4-11 | 35 | 8-9(2) | 3.0 | B to A | 88 | Inv. |
| 4-12 | 38 | 8-9(2) | 3.0 | C | 78 | Comp. |

TABLE 4-continued

| Experiment No. | HAS concentration (weight %) | Additive (weight %) | pH | Storage at low temperatures (Precipitation property) | Storage at high temperatures: Residual ratio of HAS (%) | Remarks |
|---|---|---|---|---|---|---|
| 4-13 | 42 | 8-9(2) | 3.0 | C | 76 | Comp. |
| 4-14 | 20 | 8-9(0.1) | 3.0 | C | 75 | Comp. |
| 4-15 | 20 | 8-9(0.2) | 3.0 | B to A | 84 | Inv. |
| 4-16 | 20 | 8-9(0.4) | 3.0 | A | 86 | Inv. |
| 4-17 | 20 | 8-9(3) | 3.0 | A | 87 | Inv. |
| 4-18 | 20 | 8-9(5) | 3.0 | A | 86 | Inv. |
| 4-19 | 20 | 8-9(10) | 3.0 | B | 84 | Inv. |
| 4-20 | 20 | 8-9(15) | 3.0 | C | 79 | Comp. |
| 4-21 | 20 | 8-9(20) | 3.0 | C | 79 | Comp. |
| 4-22 | 20 | 8-9(2) | 1.5 | B to C | 74 | Comp. |
| 4-23 | 20 | 8-9(2) | 2.0 | A | 87 | Inv. |
| 4-24 | 20 | 8-9(2) | 3.0 | A | 89 | Inv. |
| 4-25 | 20 | 8-9(2) | 5.0 | A | 90 | Inv. |
| 4-26 | 20 | 8-9(2) | 6.0 | A | 88 | Inv. |
| 4-27 | 20 | 8-9(2) | 6.5 | B to C | 73 | Comp. |
| 4-28 | 20 | 6-20(5) | 7.0 | C | 68 | Comp. |

In the Tables, the term "HAS" represents hydroxylamine sulfate. The additive, OPD262 employed in the Experiment No. 1-2 is one employed in example 5 of JP-A 2001-501649, corresponding to 2.39 weight % TMAH (tetramethylammonium hydroxide). Further, "A" in the evaluation of low temperature storage stability means that no precipitate was observed, "B" means that slight crystallization was observed at a level acceptable to practice, and "C" means crystallization was observed at a level unacceptable to practice.

It is apparent from Tables 1 to 4 described above that problems arisen in low temperature storage (precipitation) and high temperature storage stability of a concentrated hydroxylamine solution were overcome, when the concentration of a hydroxylamine salt was from 18 to 35 weigh %, 1 to 30 weigh % of a compound represented by the general formulas [1] to [6] or aminopolycarboxylic acid according to the invention was included, and the pH was within a range of from 2 to 6.

Further, it is apparent that problems of low temperature storage stability (precipitation) and high temperature storage stability of the concentrated hydroxylamine solution were overcome when the concentration of hydroxylamine was from 18 to 35 weight %, 0.2 to 10 weight % of a compound represented by the general formula [7] or [8] or the polyoxyethyleneoxide sorbitane or derivative thereof according to the invention was contained, and the pH was in a range of from 2 to 6.

Furthermore, it is apparent that all effects of the invention were not satisfied when anyone of the aforementioned requirements was lacking, leading to an unacceptable level to practical use.

Example 2

Plastic containers were prepared similarly to the plastic container to put sample solution in, used in Experiment No. 1-3 of Example 1, provided that the thickness and material of the container were varied so as to have a oxygen permeation coefficient, as shown in Table 5. For example, the plastic container used in example 1 was hard bottle exhibiting an oxygen permeation coefficient of 16 ml/m$^2$·atm·day. Using the thus prepared containers, experiments were carried out similarly to Example 1. Results of the storage stability are shown in Table 5.

TABLE 5

| Experiment No. | Oxygen permeation coefficient (ml/m$^2$ · atm · day) | Storage at low temperatures: Crystallization property | Storage at high temperatures: Residual ratio of HAS (%) |
|---|---|---|---|
| 5-1 | 52 | B | 87 |
| 5-2 | 46 | B | 89 |
| 5-3 | 39 | B to A | 93 |
| 5-4 | 23 | B to A | 94 |
| 5-5 | 19 | A | 96 |
| 5-6 | 16 | A | 96 |
| 5-7 | 7 | A | 97 |

As can be seen from Table 5 described above, the effect of the invention was more suitably performed when the oxygen permeation coefficient of the container was not more than 40 ml/m$^2$·atm·day, and specifically marked at not more than 20 ml/m$^2$·atm·day.

Example 3

Similarly to Example 2, experiments were carried out, except that the plastic containers (hard bottles) employed in Experiments Nos. 5-1 to 5-4 of Example 2 were replaced by flexible bags having a thickness of from 50 to 330 μm and approximately the same oxygen permeation coefficient as the respective containers. As a result, it was proved that improvements were respectively achieved by one rank with respect to precipitation after low temperature storage.

EFFECTS OF THE INVENTION

Accordingly, it was proved that according to the storage method of an aqueous hydroxylamine salt aqueous solution of the invention, precipitation of crystals from a concentrated aqueous hydroxylamine salt solution was inhibited even when the solution was stored at a relatively low temperature and components were stably kept in the solution even when stored at a relatively high temperature. Further, an aqueous hydroxylamine salt solution according to the invention can be supplied in a concentrated form, thereby allowing its container to be smaller and the total weight to be lighter, leading to more suitability for handling and physical distribution.

What is claimed is:

1. An aqueous solution comprising a hydroxylamine salt in an amount of 18 to 35 weight-%, wherein the aqueous solution further comprises at least one compound selected from the group consisting of amino polycarboxylic acids and compounds represented by the following Formulas [1] to [6] in an amount of 1 to 30 weight-%, and pH of the aqueous solution is within the range of from 2 to 6:

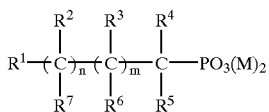

Formula [1]

wherein $R_1$ through $R_7$ each represent independently a hydrogen atom, —OH, —COOM, —$PO_3M_2$, —$SO_3M$ or a substituted or unsubstituted alkyl group having 1 to 6 carbon atoms, in which M is a hydrogen atom or an alkali metal; n and m each represent 0 or 1, provided that both m and n are not 0 at the same time;

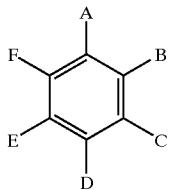

Formula [2]

wherein at least one of A through F represents a sulfonic acid group or a sulfonic acid ester group, and the others represent a hydrogen atom, a halogen atom, a hydroxyl group or a saturated or unsaturated alkyl group;

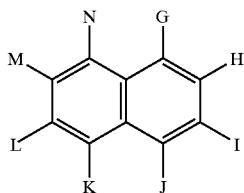

Formula [3]

wherein, at least one of G through N represents a sulfonic acid group or a sulfonic acid ester group, and the others represent a hydrogen atom, a halogen atom, a hydroxyl group or a saturated or unsaturated alkyl group;

$R_{41}$—$SO_3M$    Formula [4]

wherein $R_{41}$ represents a substituted or unsubstituted, saturated or unsaturated hydrocarbon group having 1 to 20 carbon atoms, and M represents a hydrogen atom, or an alkali metal;

HO—$(A_1$—O$)l_1$—$(A_2$—O$)l_2$—$(A_3$—O$)l_3$—H    Formula [5]

wherein $A_1$, $A_2$, and $A_3$ each represent a substituted or unsubstituted, straight or branched chain alkylene group, which may be the same or different; $l_1$, $l_2$, and $l_3$ each represent 0 or an integer of 1 to 500;

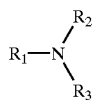

Formula [6]

wherein $R_1$ represents a substituted or unsubstituted hydroxyalkyl group or a substituted or unsubstituted aminoalkyl group; and $R_2$ and $R_3$ each represent a hydrogen atom, a substituted or unsubstituted alkyl group, a substituted or unsubstituted hydroxyalkyl group or a substituted or unsubstituted benzyl group, provided that $R_1$ and $R_2$, $R_2$ and $R_3$, $R_3$ and $R_1$, or $R_1$, $R_2$ and $R_3$ may combine with each other to form a ring.

2. An aqueous solution comprising a hydroxylamine salt in an amount of 18 to 35 weight-%, wherein the aqueous solution further comprises at least one compound selected from the group consisting of sorbitan polyethylene oxides, derivatives of sorbitan polyethylene oxide and compounds represented by the following Formulas [7] or [8] in an amount of 0.1 to 10 weight-%, and pH of the aqueous solution is within the range of from 2 to 6:

A—O—(B)$_m$—(C)$_n$—X    Formula [7]

wherein A represents a monovalent organic group or an aryl group substituted by an alkyl group having 1 to 35 carbon atoms or by an alkenyl group having 2 to 35 carbon atoms; B and C, which may be the same or different, each represents

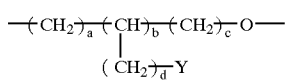

in which a, b and c each are 0, 1, 2 or 3, d is 0 or 1, and Y is a hydrogen atom or a hydroxyl group; m and n each represent an integer of 1 to 100; X represents a hydrogen atom, an alkyl group, an aralkyl group or an aryl group;

A—O—(CH$_2$CH$_2$O)$_n$—SO$_3$M    Formula [8]

wherein M represents an alkali metal, a hydrogen atom, an ammonium salt or an alkanolamine salt; n is an integer of 1 to 100; and A represents a monovalent organic group or an aryl group substituted by an alkyl group having 3 to 20 carbon atoms.

3. The aqueous solution of claim 1, wherein the aqueous solution comprises at least one compound represented by Formula [1] in an amount of 1 to 30 weight-%.

4. The aqueous solution of claim 1, wherein the aqueous solution comprises at least one amino polycarboxylic acid in an amount of 1 to 30 weight-%.

5. The aqueous solution of claim 1, wherein the aqueous solution comprises at least one compound represented by Formula [2], [3] or [4] in an amount of 1 to 30 weight-%.

6. The aqueous solution of claim 1, wherein the aqueous solution comprises at least one compound represented by Formula [5] or [6] in an amount of 1 to 30 weight-%.

7. The aqueous solution of claim 1, wherein the aqueous solution comprises at least one compound selected from the group consisting the amino polycarboxylic acids and the compounds represented by Formula [1] to [6] in an amount of 3 to 20 weight-%.

8. The aqueous solution of claim 2, wherein the aqueous solution comprises at least one compound selected from the group consisting of sorbitan polyethylene oxides, derivatives of sorbitan polyethylene oxide and compounds represented by the following Formulas [7] or [8] in an amount of 0.4 to 5 weight-%.

9. The aqueous solution of claim 1, wherein pH of the aqueous solution is within the range of 2.5 to 4.5.

10. The aqueous solution of claim 2, wherein pH of the aqueous solution is within the range of 2.5 to 4.5.

11. A storing method of an aqueous solution comprising a hydroxylamine salt in an amount of 18 to 35 weight-%, wherein the storing method comprises a step of storing the aqueous solution in an plastic container having an oxygen permeation coefficient at 20° C. and 65% RH of not more than 40 ml/m²·atm·day, and wherein the aqueous solution further comprises at least one compound selected from the group consisting of amino polycarboxylic acids and compounds represented by the following Formulas [1] to [6] in an amount of 1 to 30 weight-%, and pH of the aqueous solution is within the range of from 2 to 6:

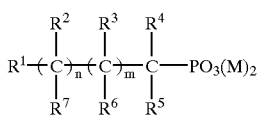 Formula [1]

wherein $R_1$ through $R_7$ each represent independently a hydrogen atom, —OH, —COOM, —PO$_3$M$_2$, —SO$_3$M or a substituted or unsubstituted alkyl group having 1 to 6 carbon atoms, in which M is a hydrogen atom or an alkali metal; n and m each represent 0 or 1, provided that both m and n are not 0 at the same time;

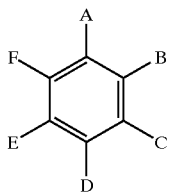 Formula [2]

wherein at least one of A through F represents a sulfonic acid group or a sulfonic acid ester group, and the others represent a hydrogen atom, a halogen atom, a hydroxyl group or a saturated or unsaturated alkyl group;

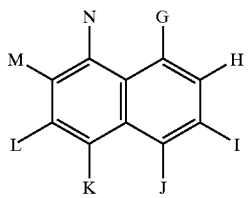 Formula [3]

wherein, at least one of G through N represents a sulfonic acid group or a sulfonic acid ester group, and the others represent a hydrogen atom, a halogen atom, a hydroxyl group or a saturated or unsaturated alkyl group;

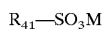 Formula [4]

wherein $R_{41}$ represents a substituted or unsubstituted, saturated or unsaturated hydrocarbon group having 1 to 20 carbon atoms, and M represents a hydrogen atom, or an alkali metal;

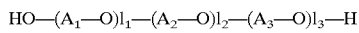 Formula [5]

wherein $A_1$, $A_2$, and $A_3$ each represent a substituted or unsubstituted, straight or branched chain alkylene group, which may be the same or different; $l_1$, $l_2$, and $l_3$ each represent 0 or an integer of 1 to 500;

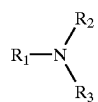 Formula [6]

wherein $R_1$ represents a substituted or unsubstituted hydroxyalkyl group or a substituted or unsubstituted aminoalkyl group; and $R_2$ and $R_3$ each represent a hydrogen atom, a substituted or unsubstituted alkyl group, a substituted or unsubstituted hydroxyalkyl group or a substituted or unsubstituted benzyl group, provided that $R_1$ and $R_2$, $R_2$ and $R_3$, $R_3$ and $R_1$, or $R_1$, $R_2$ and $R_3$ may combine with each other to form a ring.

12. A storing method of an aqueous solution comprising a hydroxylamine salt in an amount of 18 to 35 weight-%, wherein the storing method comprising a step of storing the aqueous solution in an plastic container having an oxygen permeation coefficient at 20° C. and 65% RH of not more than 40 ml/m²·atm·day, and wherein the aqueous solution further comprises at least one compound selected from the group consisting of sorbitan polyethylene oxides, derivatives of sorbitan polyethylene oxide and compounds represented by the following Formulas [7] or [8] in an amount of 0.1 to 10 weight-%, and pH of the aqueous solution is within the range of from 2 to 6:

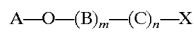 Formula [7]

wherein A represents a monovalent organic group or an aryl group substituted by an alkyl group having 1 to 35 carbon atoms or by an alkenyl group having 2 to 35 carbon atoms; B and C, which may be the same or different, each represents

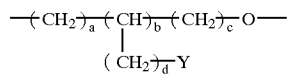

in which a, b and c each are 0, 1, 2 or 3, d is 0 or 1, and Y is a hydrogen atom or a hydroxyl group; m and n each represent an integer of 1 to 100; X represents a hydrogen atom, an alkyl group, an aralkyl group or an aryl group;

 Formula [8]

wherein M represents an alkali metal, a hydrogen atom, an ammonium salt or an alkanolamine salt; n is an integer of 1 to 100; and A represents a monovalent organic group or an aryl group substituted by an alkyl group having 3 to 20 carbon atoms.

13. The storing method of claim 11, wherein the plastic container is a flexible bag.

14. The storing method of claim 12, wherein the plastic container is a flexible bag.

15. The storing method of claim 11, wherein the oxygen permeation coefficient of the plastic container is not more than 20 ml/m²·atm·day.

16. The storing method of claim 12, wherein the oxygen permeation coefficient of the plastic container is not more than 20 ml/m²·atm·day.

* * * * *